(12) United States Patent
Kuniba

(10) Patent No.: US 6,697,529 B2
(45) Date of Patent: *Feb. 24, 2004

(54) DATA COMPRESSION METHOD AND RECORDING MEDIUM WITH DATA COMPRESSION PROGRAM RECORDED THEREIN

(75) Inventor: Hideyasu Kuniba, Shinagawa-ku (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,649

(22) Filed: Oct. 5, 1999

(65) Prior Publication Data

US 2003/0103676 A1 Jun. 5, 2003

(30) Foreign Application Priority Data

Oct. 6, 1998 (JP) ............................................ 10-284531

(51) Int. Cl.⁷ ................................................. G06K 9/36
(52) U.S. Cl. ........................ 382/239; 382/251; 382/253
(58) Field of Search ................................. 382/239, 251, 382/253, 233, 248, 250; 375/240.2

(56) References Cited

U.S. PATENT DOCUMENTS

| 5,410,352 A | 4/1995 | Watanabe | ................... 348/405 |
| 5,594,554 A | 1/1997 | Farkash et al. | ............. 358/426 |

FOREIGN PATENT DOCUMENTS

| JP | B2-7-59069 | 6/1995 | ............ H04N/5/92 |
| JP | B2-8-32037 | 3/1996 | ............ H04N/7/30 |
| JP | 408265577 A | * 10/1996 | ............ H04N/1/41 |
| JP | B2-2616229 | 3/1997 | .......... H04N/7/133 |
| JP | 409098091 A | * 4/1997 | ............ H03M/7/36 |
| JP | 409247675 A | * 9/1997 | ............ H04N/7/30 |

* cited by examiner

*Primary Examiner*—Anh Hong Do
(74) *Attorney, Agent, or Firm*—Oliff & Berridge PLC

(57) ABSTRACT

A data compression method includes: a quantization trial step in which input data are quantized using an initial quantization table set in advance; a coding trial step in which a code volume achieved when data that have undergone quantization in the quantization trial step are coded is determined; a relationship ascertaining step in which a scale factor in the initial quantization table and the code volume are substituted in "a relational expression representing a relationship between a code volume and a scale factor" containing two undetermined parameters "a" and "b" and the undetermined parameters in the relational expression are ascertained based upon "the relational expression after substitution" and "a statistical relationship between the undetermined parameters "a" and "b" determined through a previous quantization operation;" a scale factor determining step in which a target scale factor corresponding to a target code volume is determined by using the relational expression having the undetermined parameters ascertained in the relationship ascertaining step substituted therein; a quantization step in which the input data are quantized by using a quantization table corresponding to the target scale factor determined in the scale factor determining step; and a coding step in which data that have undergone quantization in the quantization step are coded.

8 Claims, 18 Drawing Sheets

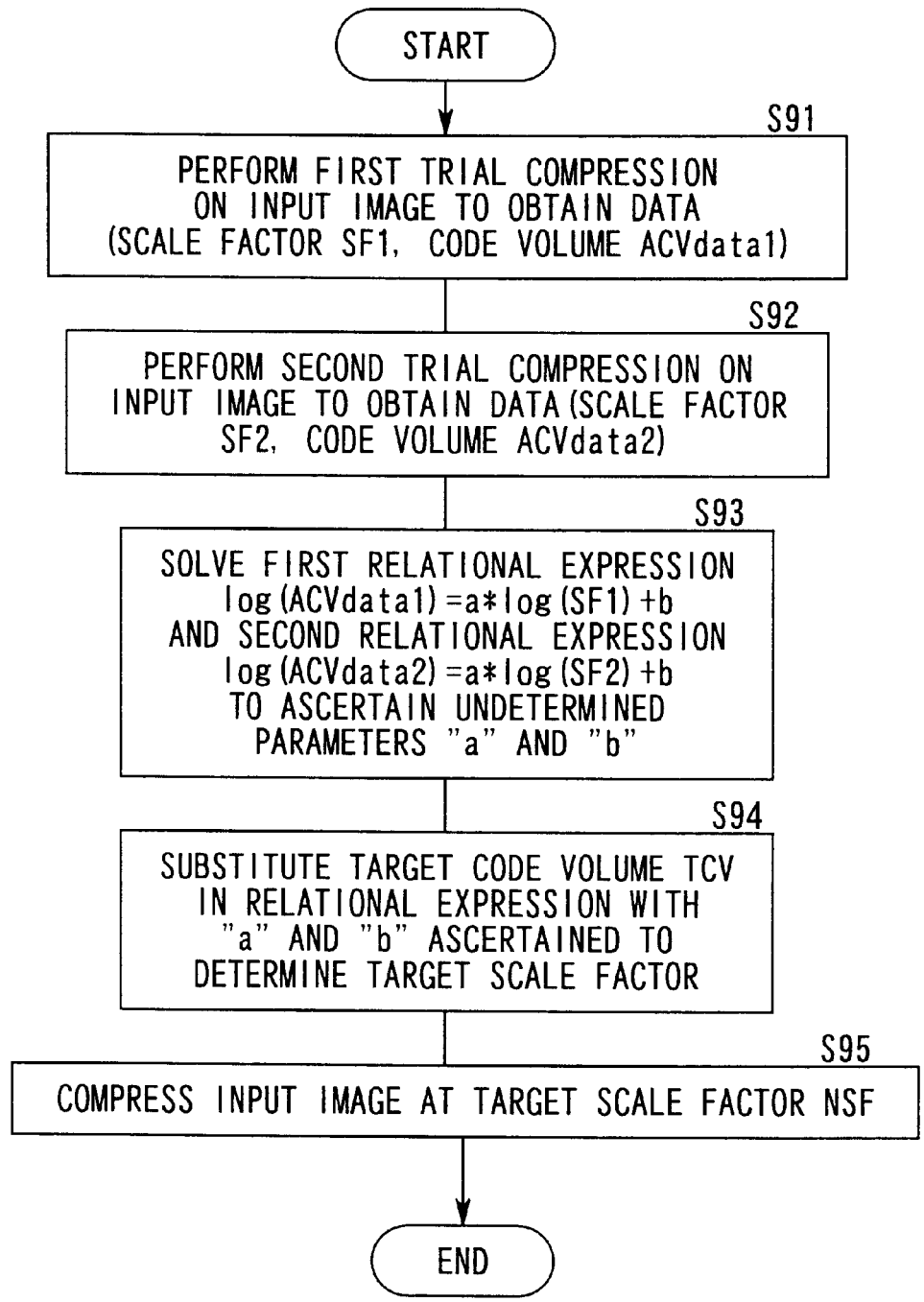

DATA COMPRESSION METHOD AND RECORDING MEDIUM WITH DATA COMPRESSION PROGRAM RECORDED THEREIN

The disclosure of the following priority application is herein incorporated by reference:

Japanese Patent Application No. 10-284531 filed Oct. 6, 1998

The disclosure of U.S. Pat. No. 5,594,554 is herein incorporated by reference.

BACKGROUND OF THE INVENTION

1. Field of the Invention

The present invention relates to a data compression method and a recording medium with a data compression program for executing the data compression method recorded therein. More specifically, the present invention relates to technology through which conditions for quantization that are required to obtain a desired code volume are determined with a high degree of accuracy through a single trial.

2. Description of the Related Art

Processing such as image compression (e.g., JPEG compression) is performed on image data as a standard procedure in an electronic camera or a computer to record image data in a recording medium with a high degree of efficiency. Such image compression processing may be executed through the procedure described in (1)~(4) below, for instance.

(1) The image data are divided into pixel blocks each constituted of approximately 8×8 pixels. Orthogonal transformation such as DCT (discrete cosine transformation) is performed on these pixel blocks to convert the image data to spatial frequency components.

(2) A standard quantization table that defines quantization increments corresponding to the individual spatial frequency components constituted of 8×8 pixels is prepared. The standard quantization table is multiplied by a scale factor SF to obtain a quantization table that is to be used.

(3) Using the quantization table obtained as described above, the data that have undergone DCT are quantized.

(4) The quantized data are coded through variable-length coding, run-length coding or the like.

However, since the volume of information greatly varies among different sets of image data, it is extremely difficult to uniformly predict the code volume after compression. For this reason, it is necessary to follow the procedure in (1)~(4) described above many times while varying the value of the scale factor SF in order to perform the compression which results in a desired code volume (hereafter referred to as the "target code volume"). As a means for reducing the number of such trials, U.S. Pat. No. 5,594,554, the disclosure of which is herein incorporated by reference, discloses a method whereby a correct scale factor SF is determined based upon the minimum of two trial compressions.

FIG. 18 is a flowchart illustrating this method in the prior art. The following is an explanation of the method in the prior art, given along the flow of the steps in FIG. 18. First, in the method in the prior art, a first trial compression is performed on input image data. A scale factor SF1 used at this time and a code volume ACVdata1 after the compression are stored in memory (FIG. 18 S91).

Next, a second trial compression is performed on the input image data. A scale factor SF2 used at this time and a code volume ACVdata2 after the compression are stored in memory (FIG. 18 S92). The results thus obtained are incorporated in a relational expression representing the relationship between the scale factor SF and the code volume ACVdata to obtain;

First Relational Expression:

$$log(ACVdata1)=a*log(SF1)+b \quad (1)$$

and
Second Relational Expression:

$$log(ACVdata2)=a*log(SF2)+b \quad (2).$$

By solving expression 1 and expression 2 above, the two undetermined parameters "a" and "b" in the relational expressions are ascertained (FIG. 18 S93). As a result, a relational expression that expresses in approximation the relationship between the scale factor SF and the code volume ACVdata is obtained for the input image data;

Relational Expression:

$$log(ACVdata)=a*log(SF)+b \quad (3).$$

By solving this relational expression 3 with a target code volume TCV substituted in it, an appropriate target scale factor NSF for achieving the target code volume TCV is calculated (FIG. 18 S94). Using this target scale factor NSF, the input image data are compressed again (FIG. 18 S95).

In the method in the prior art described above, at least two trial compressions must be executed to ascertain the two undetermined parameters "a" and "b". However, a further reduction in the number of trials is urgently required to support faster image compression and the like.

SUMMARY OF THE INVENTION

An object of the present invention is to provide a data compression method that makes it possible to obtain a target scale factor NSF through a single trial and a recording medium having a data compression program that makes it possible to implement the data compression method on a computer recorded therein.

FIG. 1 is a flowchart that illustrates the present invention. The following is an explanation of the present invention given in reference to FIG. 1.

In order to achieve the object described above, the data compression method according to the present invention comprises a quantization trial step (FIG. 1 S1, FIG. 4 S36, FIG. 9 S48, FIG. 12 S36, FIG. 14 S76) in which input data are quantized using an initial quantization table that is set in advance, a coding trial step (FIG. 1 S2, FIG. 4 S36, FIG. 9 S48, FIG. 12 S36, FIG. 14 S77) in which a code volume achieved when the data that have undergone quantization in the quantization trial step are coded is determined, a relationship ascertaining step (FIG. 1 S3 and S4, FIG. 4 S37, FIG. 9 S52, FIG. 12 S37, FIG. 14 S78 and S79) in which the scale factor in the initial quantization table and the code volume are substituted in "the relational expression representing the relationship between the code volume and the scale factor" that includes two undetermined parameters "a" and "b" to ascertain the undetermined parameters in the relational expression based upon "the relational expression after the substitution" and "the statistical relationship between the undetermined parameters "a" and "b" obtained through a previous quantization operation," a scale factor determining step (FIG. 1 S5, FIG. 4 S38, FIG. 9 S53, FIG. 12 S38, FIG. 14 S80) in which a target scale factor that corresponds to the target code volume is determined by using the relational expression having the undetermined parameter ascertained in the relationship ascertaining step substituted therein, a quantization step (FIG. 1 S6 and S7, FIG. 4 S39, FIG. 9 S54, FIG. 12 S39, FIG. 14 S81 and S82) in which the input data are quantized using a quantization table that corresponds to the target scale factor determined in the scale factor determining step and a coding step (FIG. 1 S8, FIG. 4 S39, FIG. 9 S54, FIG. 12 S39, FIG. 14 S83) in which the data that have been quantized in the quantization step are coded.

The inventors of the present invention have discovered that, as demonstrated in the embodiments which are to be detailed later, there is a statistical relationship achieving a high degree of reproducibility between the two undetermined parameters "a" and "b". Thus, in the relationship ascertaining step in the present invention, this statistical relationship obtained through a previous quantization operation is utilized to ascertain the undetermined parameters. This substantially reduces the number of undetermined parameters in the relational expression explained above from 2 to 1.

Thus, it becomes possible to ascertain all the undetermined parameters in the relational expression by obtaining trial data of the input data (the scale factor, the code volume) at least once. Consequently, through the data compression method according to the present invention, the number of trials can be reduced compared to the number of trials required in the method in the prior art (at least 2), so that the quantity of calculation required in the data compression method and the length of time required for implementing the data compression method are reduced with a high degree of reliability.

In the data compression method described above, it is preferable that the relationship ascertaining step includes steps (1) and (2) described below.

(1) An area selection step (FIG. 9 S49) in which, with coordinate space whose axes are the scale factor and the code volume divided into a plurality of areas and the statistical relationship between the two undetermined parameters "a" and "b" ascertained in advance for each of those areas, one of the plurality of areas is selected based upon the scale factor in the initial quantization table and the code volume determined in the coding trial step and (2) An individual area relationship ascertaining step (FIG. 9 S50~S52) in which the undetermined parameters in the relational expression are ascertained by substituting the scale factor in the initial quantization table and the code volume determined in the coding trial step in the relational expression, based upon "the relational expression after the substitution" and "the statistical relationship in the area selected in the area selection step."

In the data compression method described above, the coordinate space whose axes are the scale factor and the code volume is divided into a plurality of areas and the parameters are ascertained for the individual areas. By determining the statistical relationship for each area in this manner, the accuracy and the reproducibility of the statistical relationship in the individual areas can be further improved. Thus, it is possible to ascertain the parameters with an even higher degree of accuracy.

In addition, in the area selection step, an area is selected based upon the scale factor and the code volume obtained during the trial stage. Thus, "the area selection" and "the parameter ascertaining" can be executed at once using the results of a single trial to minimize the degree of increase in the calculation quantity and the required length of processing time that the processing of the individual areas entails.

Furthermore, during the scale factor determining step, it is preferable that the target code volume be varied in correspondence to the code volume determined in the coding trial step (FIG. 12 S60 and S61). By adopting such a data compression method, it is possible to avoid any degradation of information by increasing the target code volume when, for instance, the code volume obtained during the trial stage is relatively large and, consequently, high compression is difficult to achieve.

If, on the other hand, it is assumed that high compression of the input data is possible due to a small code volume obtained during the trial stage, the code volume can be reduced to an appropriate degree by lowering the target code volume. By varying the target code volume in conformance to the code volume obtained during the trial stage, it becomes possible to execute quantization that corresponds to the quality and the content of the input data in a flexible manner. In addition, such a change of the target code volume is executed based upon the code volume obtained during the trial stage. Consequently, it is possible to execute both "the change of target code volume" and "parameter ascertaining" at once using the results of a single trial so that the degree to which the calculation quantity and the required length of processing time increase due to the change of the target code volume can be minimized.

Another data compression method comprises a quantization trial step (FIG. 1 S1, FIG. 4 S36, FIG. 9 S48, FIG. 12 S36) in which input data are quantized using an initial quantization table set in advance, a coding trial step in which a code volume ACVdata achieved when the data that have been quantized in the quantization trial step are coded is determined, a relationship ascertaining step (FIG. 1 S3 and S4, FIG. 4 S37, FIG. 9 S52, FIG. 12 S37) in which an unknown parameter "a" is ascertained by calculating $$a = \{log(ACVdata) - C2\} / \{log(ISF) + C1\},$$

using the code volume ACVdata, the scale factor ISF in the initial quantization table and values C1 and C2 which are statistically determined through a previous quantization operation, a scale factor determining step (FIG. 1 S5, FIG. 4 S38, FIG. 9 S53, FIG. 12 S38) in which a target scale factor NSF is determined by calculating $$NSF = (ACVdata/TCV)^{(-1/a)} * ISF,$$

using the code volume ACVdata, the scale factor ISF in the initial quantization table and a target code volume TCV, a quantization step (FIG. 1 S6 and S7, FIG. 4 S39, FIG. 9 S54, FIG. 12 S39) in which the input data are quantized using a quantization table that corresponds to the target scale factor NSF determined in the scale factor determining step and a coding step (FIG. 1 S8, FIG. 4 S39, FIG. 9 S54, FIG. 12 S39) in which the data quantized in the quantization step are coded.

The data compression method described above is characterized in that the statistical relationship between the undetermined parameters "a" and "b" is expressed through a linear expression, b=C1*a+C2. Thus, the statistical relationship can be stored in a simple manner using the two coefficients C1 and C2. In addition, since a simple linear expression is used when ascertaining the parameters, too, the calculation quantity and the required length of processing time can be reduced with ease.

Another data compression method comprises a quantization trial step (FIG. 16 S101) in which input data are quantized using an initial quantization table, a coding trial step (FIG. 16 S102) in which the code volume achieved when the data that have been quantized in the quantization trial step are coded is determined, a scale factor determining step (FIG. 16 S103 and S104) in which a target scale factor that corresponds to the code volume determined in the coding trial step is determined based upon the correlation between "the code volume resulting from quantization and coding of test data performed by using the initial quantization table" and "the target scale factor to be used to quantize the test data to achieve a target code volume" that is ascertained and stored in advance, a quantization step (FIG. 16 S105) in which the input data are quantized using a quantization table corresponding to the target scale factor determined in the scale factor determining step and a coding step (FIG. 16 S106) in which the data quantized in the quantization step are coded.

As mentioned earlier, the inventors of the present invention have learned that there is a statistical relationship that achieves a high degree of reproducibility between the two undetermined parameters "a" and "b". This means that "the code volume obtained during the trial stage" and "the target scale factor" correspond with each other on a one-to-one basis (in a univocal manner) with a high degree of probability. Thus, in the data compression method described above, the one-to-one correlation mentioned above is determined through testing and is stored as a preparation. Then, based upon this correlation, the corresponding target scale factor is directly or through interpolation obtained using the code volume obtained during the trial stage. Consequently, the target scale factor can be determined quickly without having to perform any arithmetic operation to calculate the undetermined parameters.

In the recording medium according to the present invention, a data compression program for executing the various data compression methods described above on a computer or an information processing apparatus is recorded. In addition, the data signal embodied in a carrier wave according to the present invention comprises the data compression program for executing the various data compression methods described above on a computer or an information processing apparatus. Furthermore, a data compression processing apparatus according to the present invention executes the various data compression methods explained above on input data. The electronic camera according to the present invention executes the various data compression methods on image data obtained through image capturing.

BRIEF DESCRIPTION OF THE DRAWINGS

FIG. 18 illustrates a method in the prior art.

DESCRIPTION OF THE PREFERRED EMBODIMENTS

The following is an explanation of the embodiments of the present invention, given in reference to the drawings.
(First Embodiment)

Figure 1:
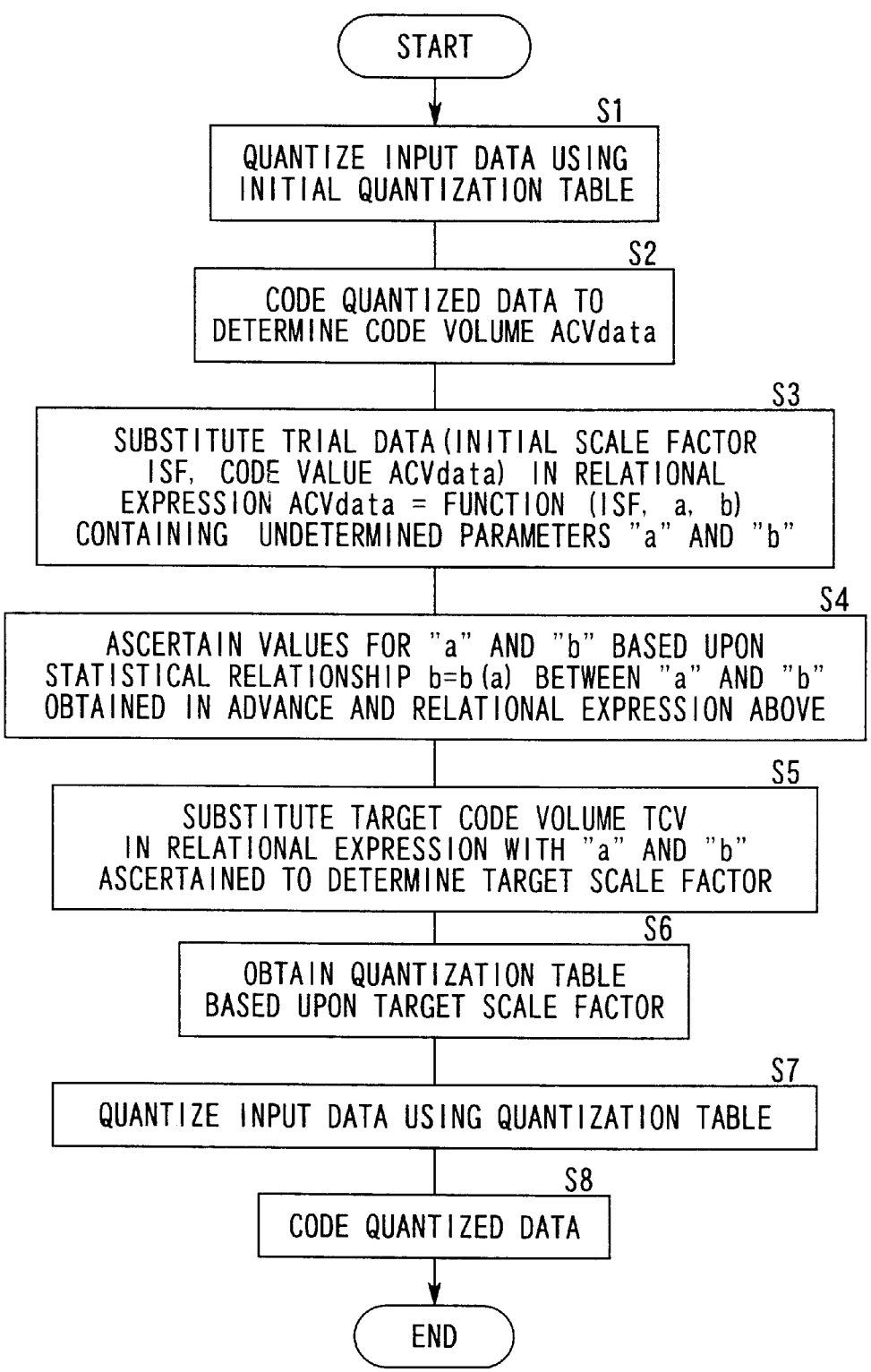
FIG. 1 is a flowchart illustrating the present invention.
Figure 2:
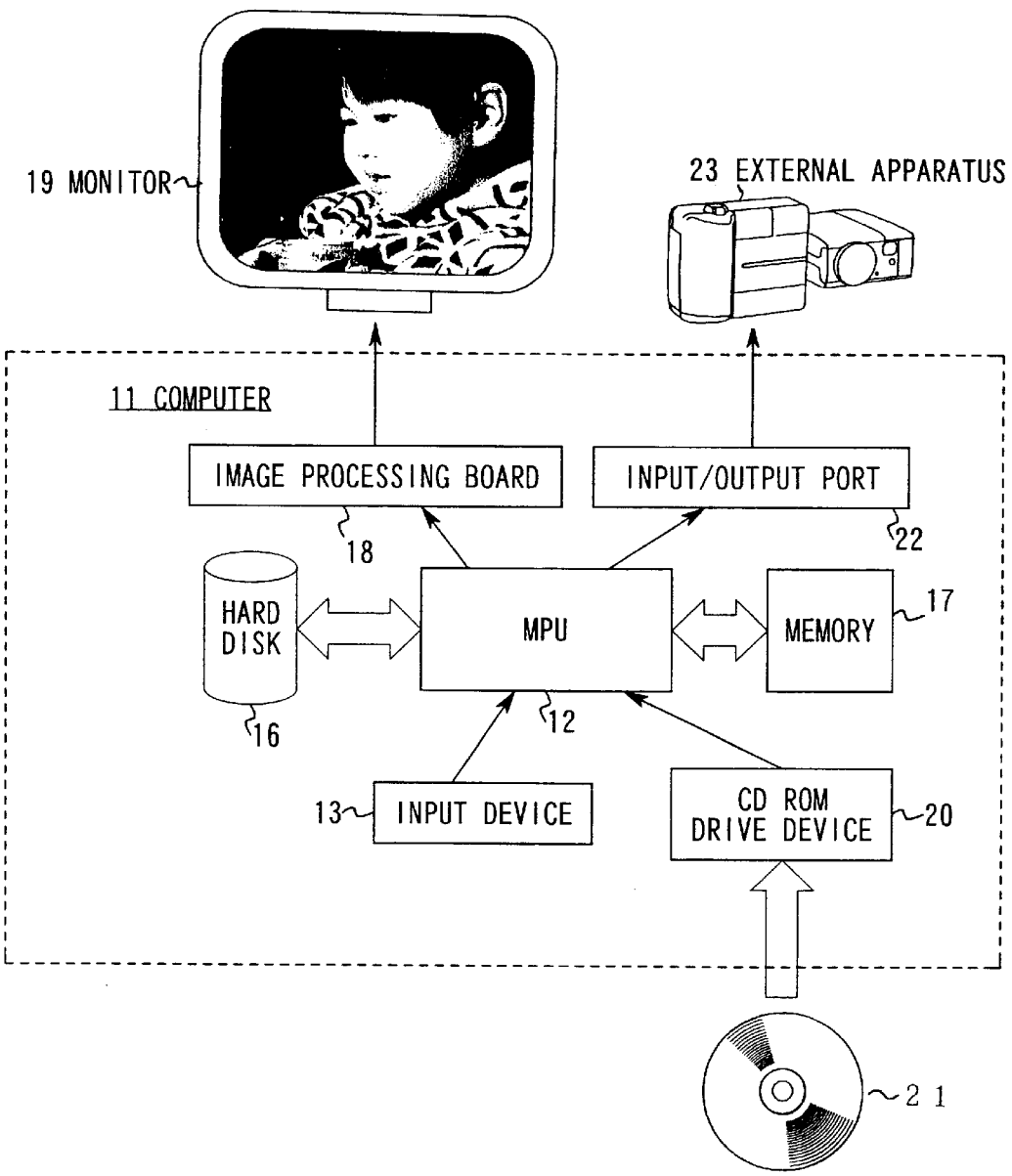
FIG. 2 illustrates a system configuration employed to implement the quantization method.

FIG. 2 illustrates a system configuration which may be adopted to implement the quantization or data compression method in the first embodiment. In FIG. 2, a computer 11 is internally provided with an MPU (microprocessor) 12. An input device 13 constituted of a keyboard, a mouse and the like, a hard disk 16, a memory 17, an image processing board 18, a CD ROM drive device 20 and an input/output port 22 are connected to the MPU 12. A monitor 19 is connected to an image output terminal of the image processing board 18. In addition, an external apparatus 23 such as an electronic camera is connected to the input/output port 22.

A CD ROM 21, in which an image compression program that includes a quantization program and an installation program for installing the image compression program are recorded is inserted in the CD ROM drive device 20. The installation program in the CD ROM 21 enables the MPU 12 to arrange the individual programs in the CD ROM 21 so that they can be stored in the hard disk 16 in an executable state.
(Explanation of the Preparation)

Figure 3:
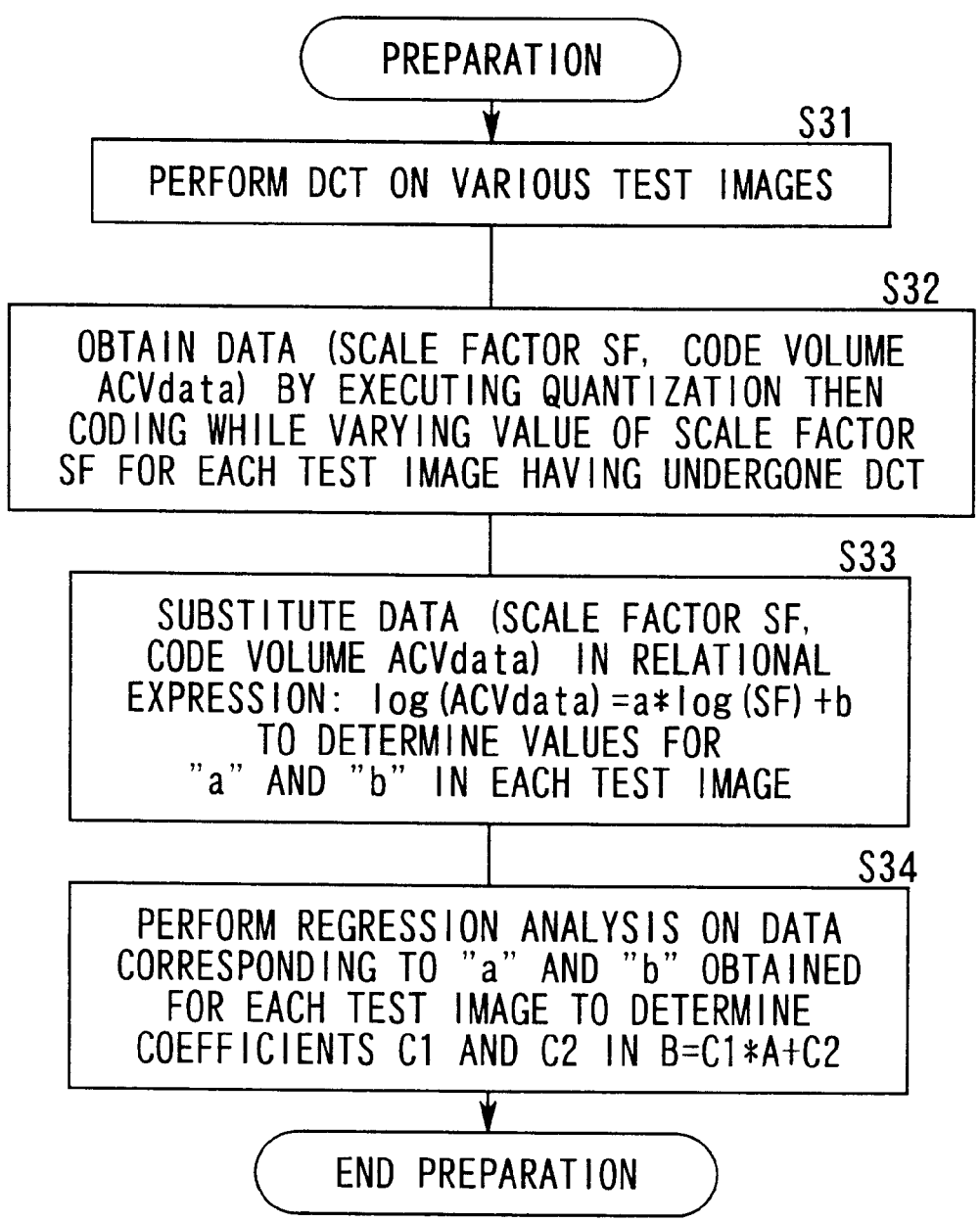
FIG. 3 illustrates the preparation procedure for the quantization method.

FIG. 3 is a flowchart illustrating the preparation procedure for the quantization method. Such a preparation is performed during, for instance, the development of the quantization program under normal circumstances. It is to be noted that, alternatively, the user of the computer 11 may execute the preparation by selecting specific images that are used frequently so that the values for the coefficients C1 and C2 (to be detailed later) in the program can be changed.

First, in reference to FIG. 3, the procedure of this preparation is explained (in this context, the executor of the preparation is assumed to be the developer of the program to simplify the explanation). The developer prepares standard images (hereafter referred to as "test images") of as many types as possible within a range representative of the images to be processed. The developer executes DCT transformation on these test images (FIG. 3 S31).

Figure 5:
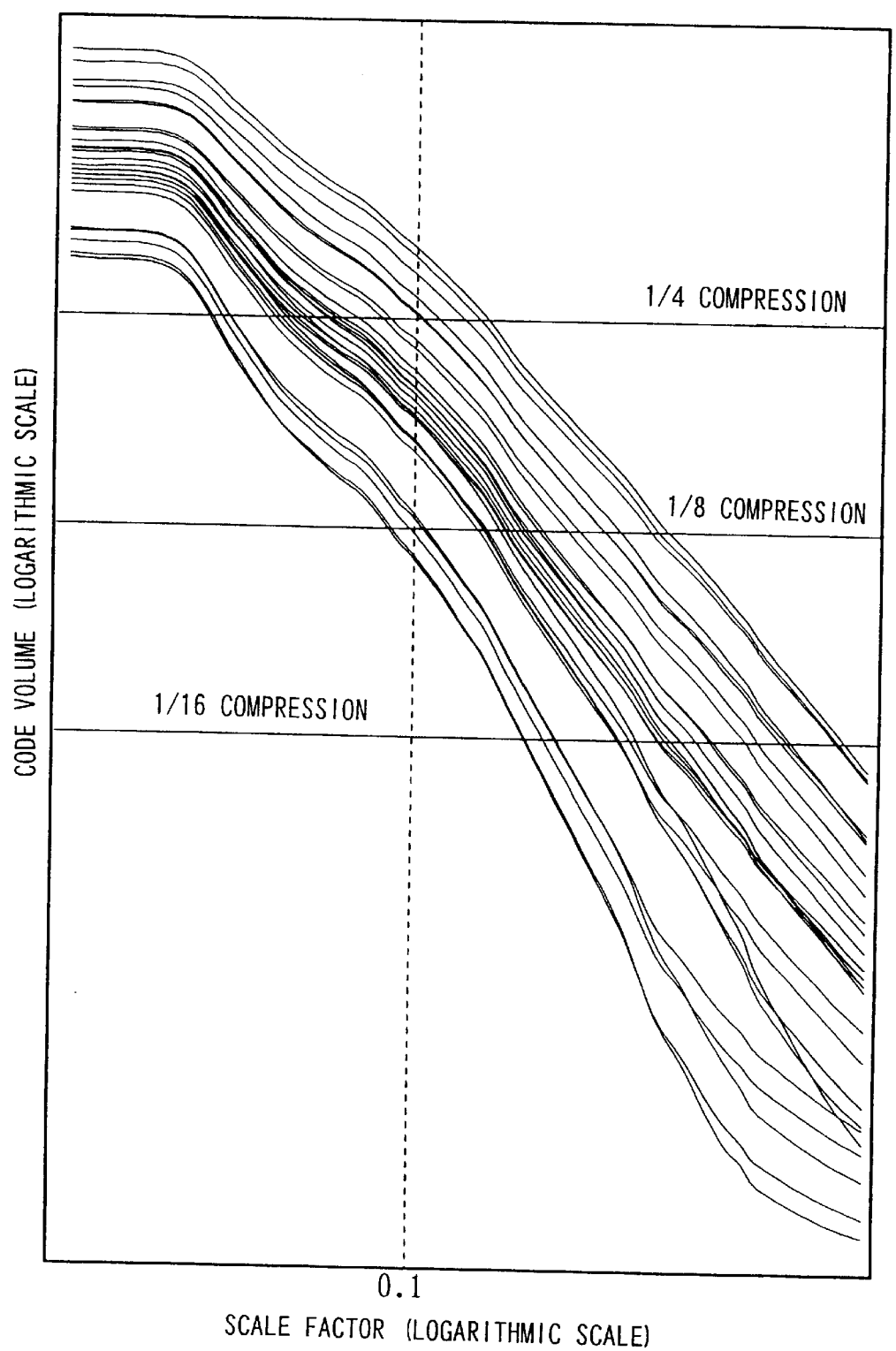
FIG. 5 presents examples of data (scale factor SF, code volume ACVdata)

Next, the developer obtains a number of sets of data (scale factor SF, code volume ACVdata) by repeating quantization and coding while gradually changing the value of the scale factor SF on the individual test images having undergone the DCT (FIG. 3 S32). In FIG. 5, examples of data (scale factor SF, code volume ACVdata) thus obtained are plotted in correspondence to the individual test images.

Next, the developer performs regression analysis on the data in correspondence to the individual test images and determines parameters "a" and "b" that satisfy;
Relational Expression:

$$log(ACVdata)=a*log(SF)+b \quad (4)$$

(FIG. 3 S33).

Figure 6:
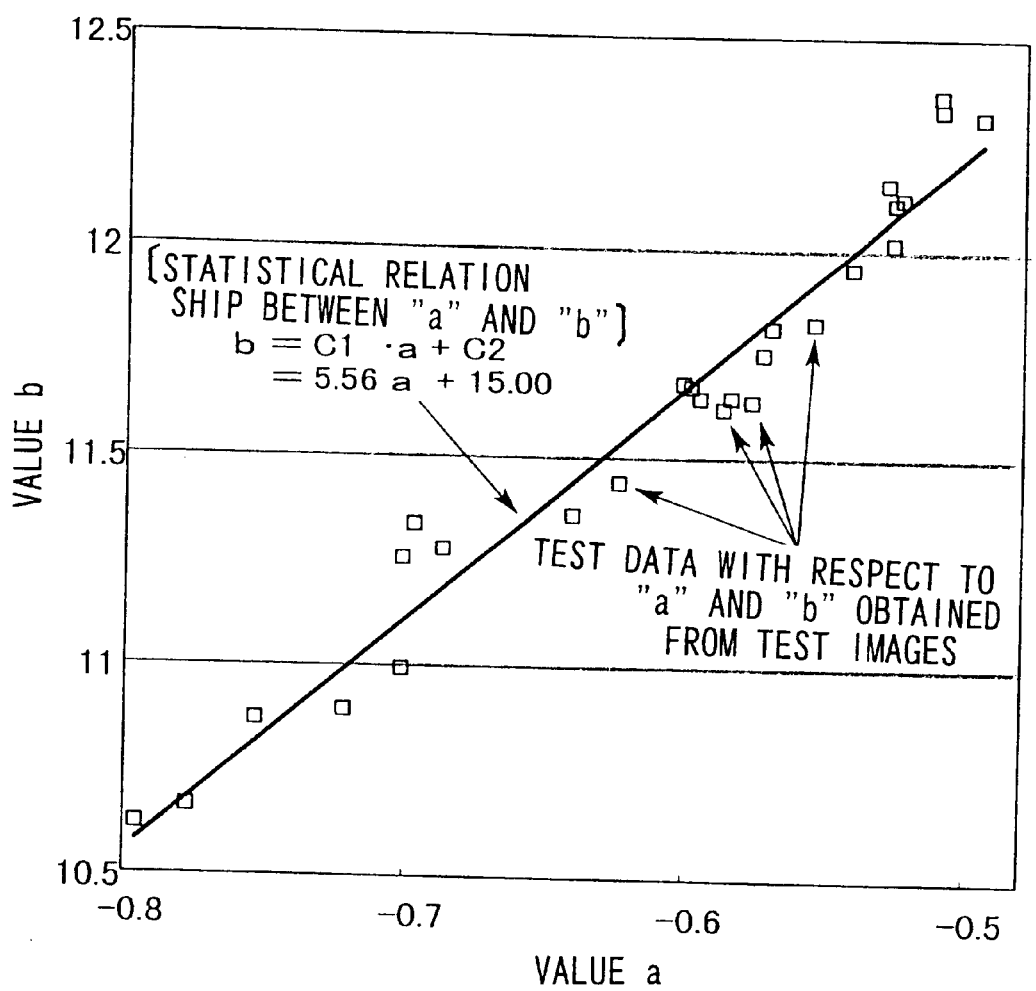
FIG. 6 presents plotted test data of the undetermined parameters "a" and "b"

In FIG. 6, specific test data with respect to the parameters "a" and "b" obtained through this process are plotted. It is to be noted that a great number of test images that may be specifically classified into (1)~(4) below are used to obtain such test data.

(1) Images of test charts such as an ITE super-fine resolution chart, an ITE super-fine gray scale chart, super-fine standard image (food), a super-fine circular zone plate, a skin-color chart, a marina, a sweater and a valise, the Eiffel Tower, a hat shop, lovers in the snow, a bulletin board, a tulip garden and chroma keys, captured by an electronic camera.

(2) Captured images of various outdoor scenes in fair weather with a wide range of brightness levels (including flat areas such as sky and clouds, detailed areas such as trees and flower beds and the like) and people.

(3) Captured images of night scenes with reduced color and brightness differences.

(4) Captured images of people taken indoors where brightness differences are small.

As illustrated in FIG. 6, the test data with respect to the parameters "a" and "b" are not distributed randomly but are distributed with a statistical relationship achieving a high degree of reproducibility. Thus, the developer determines coefficients C1 and C2 that satisfy the statistical relationship between "a" and "b";

$$b=C1*a+C2 \quad (5)$$

by performing a regression analysis on the test data with respect to "a" and "b" presented in FIG. 6 (FIG. 3 S34). The developer then stores the coefficients C1 and C2 thus determined in the quantization program.

(Explanation of the Quantization Method)

Following is a detailed explanation of the quantization method.

Figure 4:
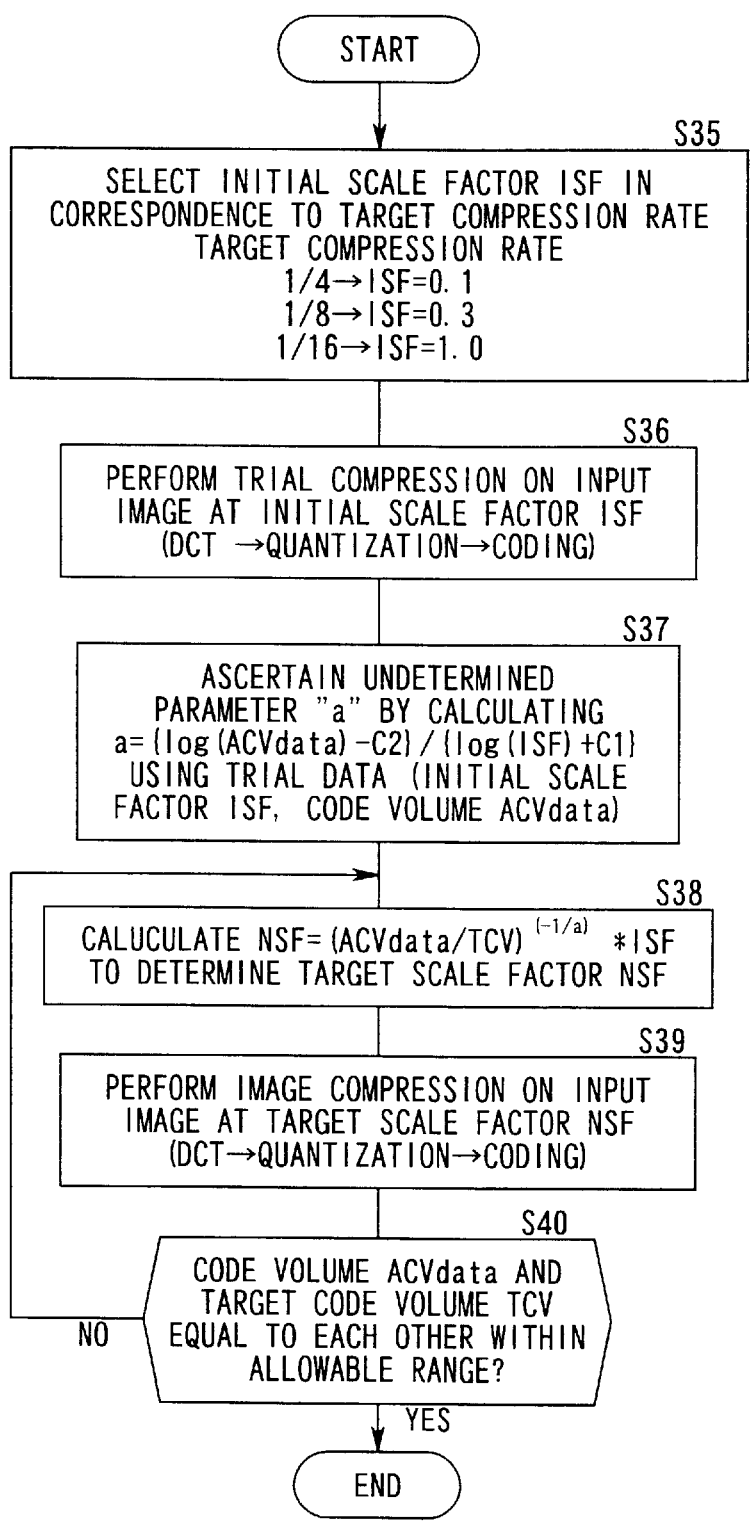
FIG. 4 is a flowchart that schematically illustrates the image compression program (which includes the quantization program)

FIG. 4 is a flowchart that schematically illustrates the image compression program (which includes the quantization program) executed by the MPU 12. First, the MPU 12 selects one initial scale factor ISF in correspondence to the value of the target compression rate (FIG. 4 S35).

The MPU 12 obtains an initial quantization table to be used for a trial compression by multiplying the standard quantization table by the initial scale factor ISF thus selected. Using this initial quantization table, the MPU 12 performs a trial compression on an input image (FIG. 4 S36).

Next, the MPU 12 calculates;

$$a=\{log(ACVdata)-C2\}/\{log(ISF)+C1\} \quad (6),$$

using the code volume ACVdata after the trial compression and the initial scale factor ISF to ascertain the undetermined parameter "a" (FIG. 4 S37).

It is to be noted that the expression 6 is an expression that is obtained based upon the relational expression 4 in which initial scale factor ISF and code volume ACVdata are substituted and the statistical relationship expression 5 between "a" and "b" determined through the preparation. The code volume ACVdata is obtained by coding data that has been quantized by using the initial scale factor. However, it may not be needed that the coded data file are actually generated. Any method is acceptable to count the code volume ACVdata. Also, the code volume ACVdata may be obtained by an approximate calculation with an expression obtained through an experiment or the like.

Next, the MPU 12 calculates;

$$NSF=(ACVdata/TCV)^{(-1/a)}*ISF \quad (7),$$

using the target code volume TCV (=input data code volume×target compression rate) to determine an appropriate target scale factor NSF for achieving the target code volume TCV (FIG. 4 S38).

The expression 7 is obtained by substituting "target scale factor NSF and target code volume TCV" in the relational expression 4 having the undetermined parameter "a" ascertained and transforming the relational expression. It is to be noted that during the process of transforming the expression, the undetermined parameter "b" is eliminated by using the relational expression 4 having "initial scale factor ISF and code volume ACVdata" substituted therein to simplify the expression.

Next, the MPU 12 performs image compression on the input image again, using the target scale factor NSF (FIG. 4 S39). At this point, the MPU 12 makes a decision as to whether or not the code volume after the image compression falls within an allowable range of the target code volume TCV (FIG. 4 S40). If it falls outside the allowable range by any chance (FIG. 4 S40 NO), the MPU 12 returns to the operation in step S38 to repeat the image compression with an updated target scale factor NSF.

If it falls within the allowable range (FIG. 4 S40 YES), the MPU 12 decides that the desired image compression (quantization) has been achieved and ends the operation.

(Advantages of the First Embodiment)

As explained above, the number of undetermined parameters in the relational expression is reduced to substantially 1 by using the statistical relationship between the undetermined parameters "a" and "b" in the first embodiment. Consequently, it is possible to ascertain all the undetermined parameters in the relational expression based upon the results of a minimum of one trial compression. Thus, it is not necessary to execute at least two trial compression operations as in the method in the prior art, so that the calculation quantity and the required length of processing time can be reduced with a high degree of reliability.

In addition, in the first embodiment in particular, the statistical relationship between the undetermined parameters "a" and "b" is stored in memory as the values of the coefficients C1 and C2. As a result, it is not necessary to store a complex functional expression or a complex data table to store the statistical relationship. Furthermore, since a simple linear expression is used to ascertain the parameters, too, the calculation quantity and the required length of processing time can be reduced.

(Second Embodiment)

Figure 7:
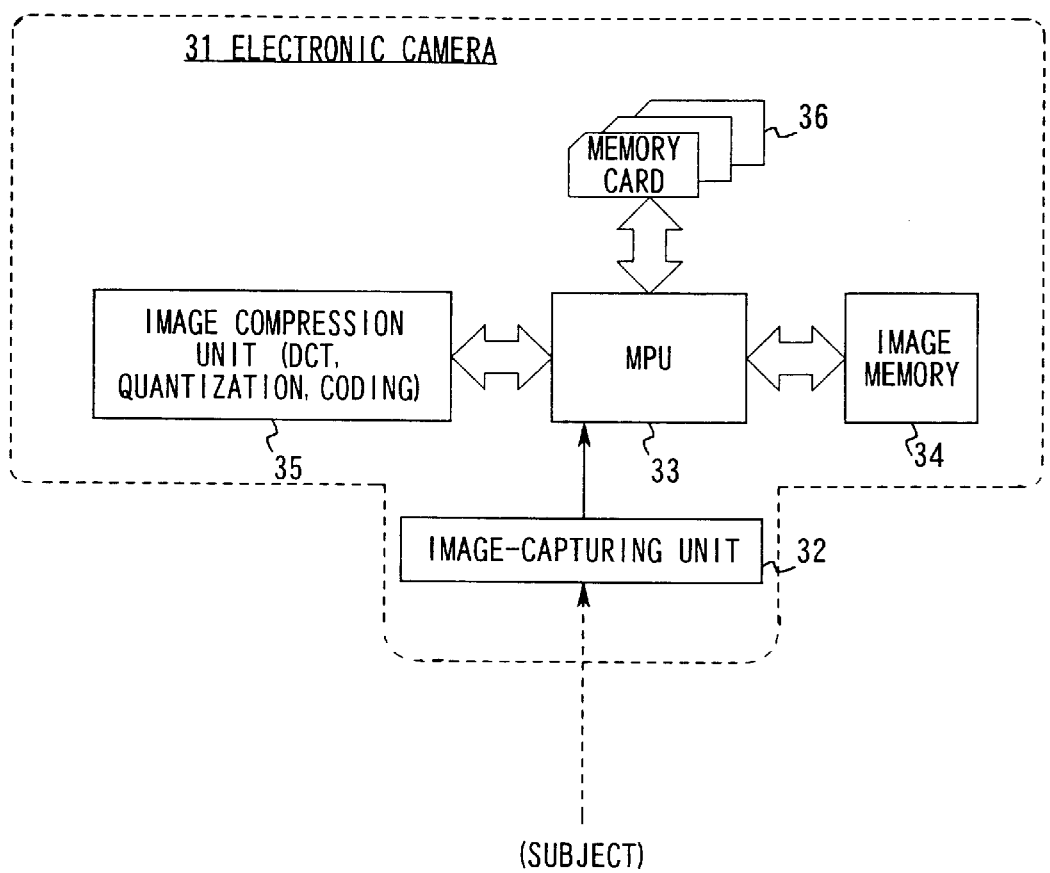
FIG. 7 is a block diagram of the electronic camera 31.

FIG. 7 is a block diagram of an electronic camera employed to execute the quantization method (or data compression method) in the second embodiment.

In FIG. 7, the electronic camera 31 is provided with an image-capturing unit 32 constituted of a photographing optical system, an image-capturing element and the like. An image signal obtained through image capturing at the image-capturing unit 32 is sent to an MPU (microprocessor) 33 after undergoing color signal processing, A/D conversion and the like in the known art. An image compression unit 35 that exclusively engages in JPEG compression, an image memory 34 that temporarily stores image data, a memory card 36 that stores compressed image data and the like are connected to the MPU 33.

(Explanation of the Preparation)

Figure 8:
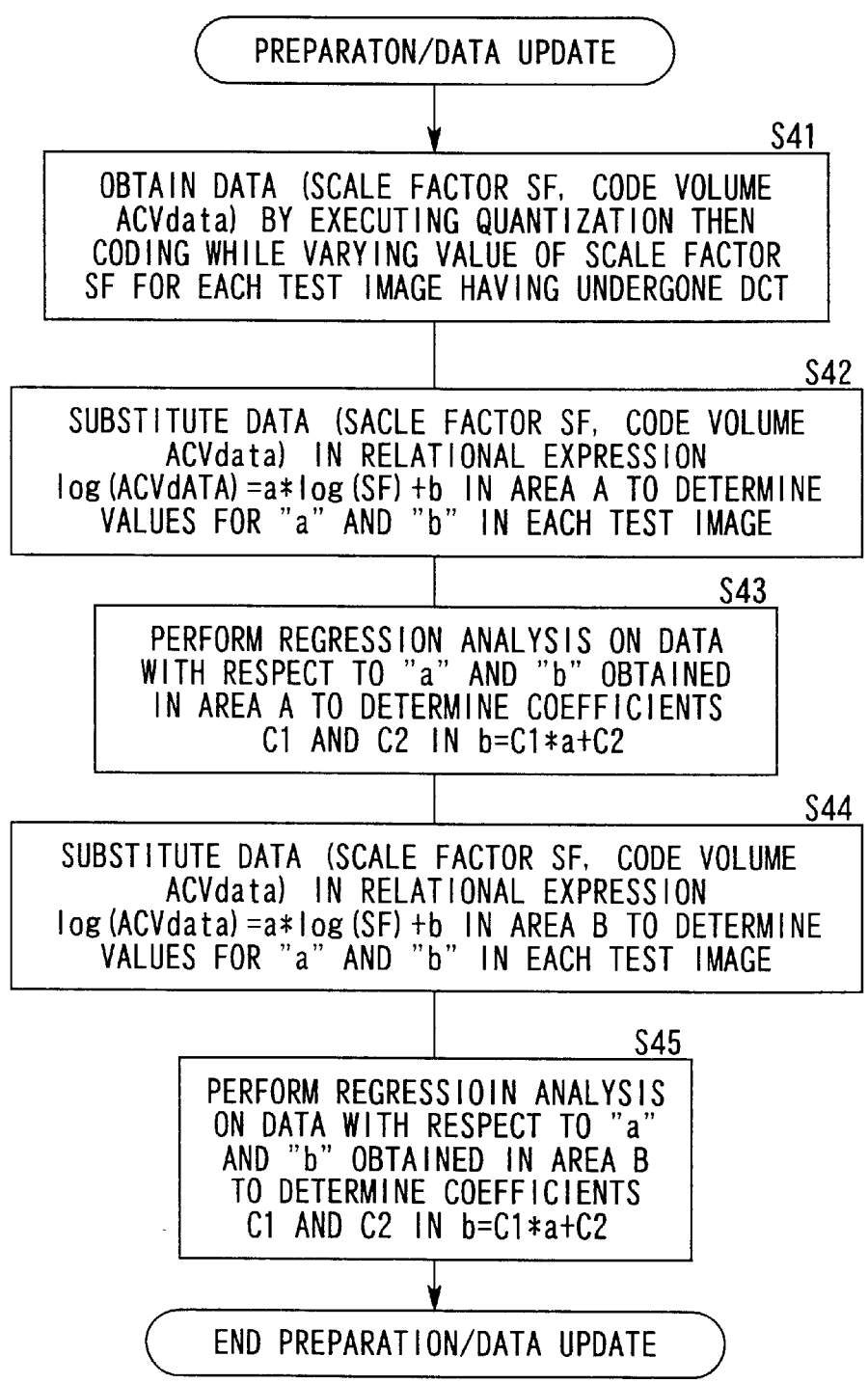
FIG. 8 illustrates the preparation procedure for the quantization method.

FIG. 8 illustrates the procedure of the preparation performed for the quantization method. Such a preparation is implemented while designing the electronic camera 31 under normal circumstances. It is to be noted that the electronic camera 31 may execute the preparation procedure on a captured image during intervals between image capturing operations to automatically update the coefficients C1 and C2 (to be detailed later). By performing such update processing, correct coefficients C1 and C2 that are in conformance with the photographing tendency of the camera user can be obtained.

First, in reference to FIG. 8, the procedure of this preparation is explained. In this context, the executor of the preparation is assumed to be the designer of the electronic camera 31 to simplify the explanation.

The designer prepares test images of as many types as possible within a range representative of the images to be processed. The designer executes DCT on these test images.

Next, the designer obtains a number of sets of data (scale factor SF, code volume ACVdata) by repeating quantization and coding while gradually changing the value of the scale factor SF on the individual test images having undergone DCT (FIG. 8 S41).

Figure 10:
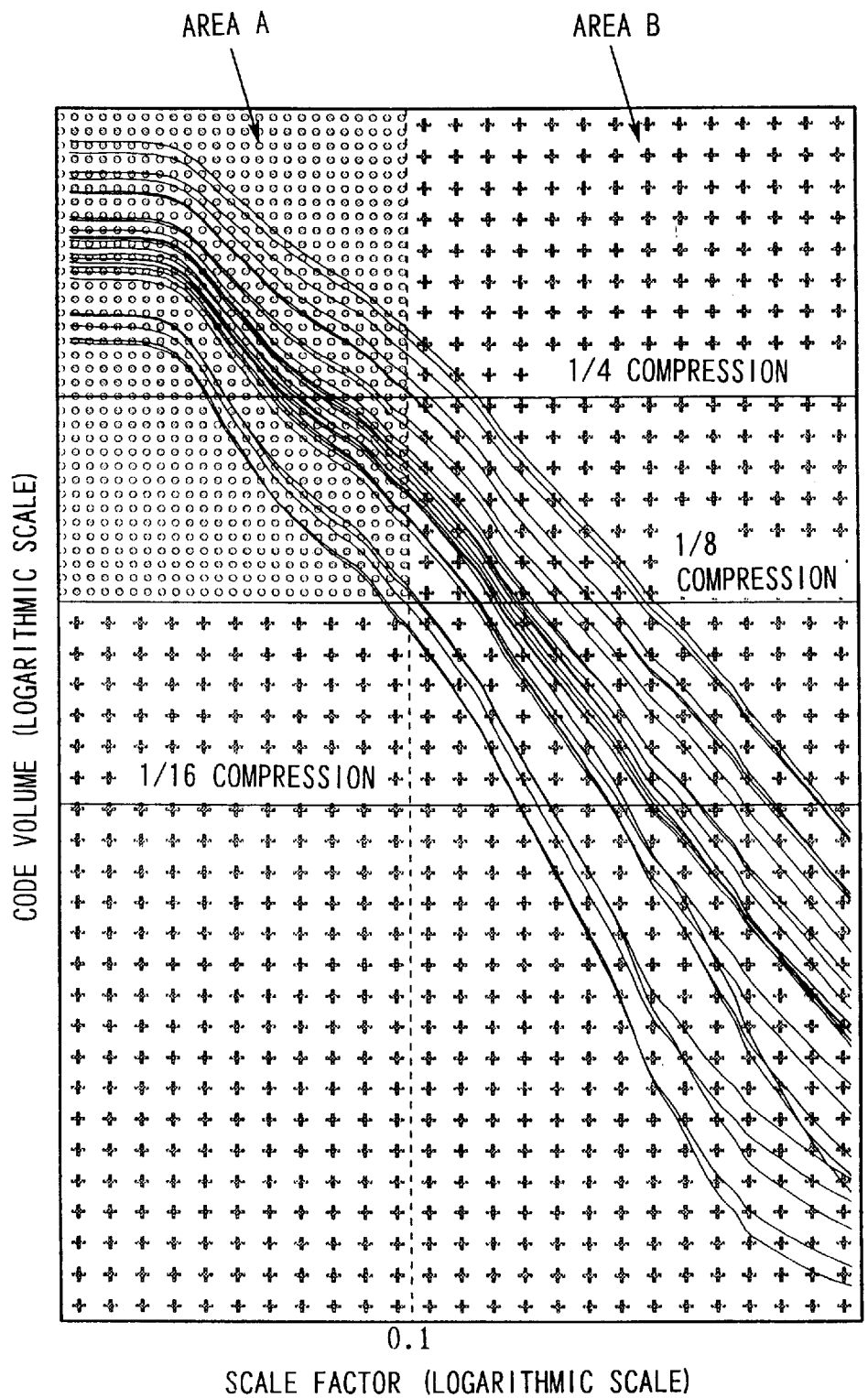
FIG. 10 presents examples of data (scale factor SF, code volume ACVdata)

FIG. 10 presents examples of data (scale factor SF, code volume ACVdata) thus obtained. The designer divides a coordinate space (scale factor SF, code volume ACVdata) into a plurality of areas A and B as illustrated in FIG. 10, based upon the data distribution curves. Next, the designer performs regression analysis on the data corresponding to the area A to determine the parameters "a" and "b" that satisfy relational expression;

$$log(ACVdata) = a*log(SF) + b \qquad (8)$$

for the individual test images (FIG. 8 S42).

Then, the designer performs regression analysis on the parameters "a" and "b" determined for the area A to ascertain coefficients C1 and C2 that satisfy statistical relationship between "a" and "b":

$$b = C1*a + C2 \qquad (9)$$

(FIG. 8 S43).

The designer implements similar processing for the area B as well (FIG. 8 S34 and S45) to determine the coefficients C1 and C2.

Figure 11:
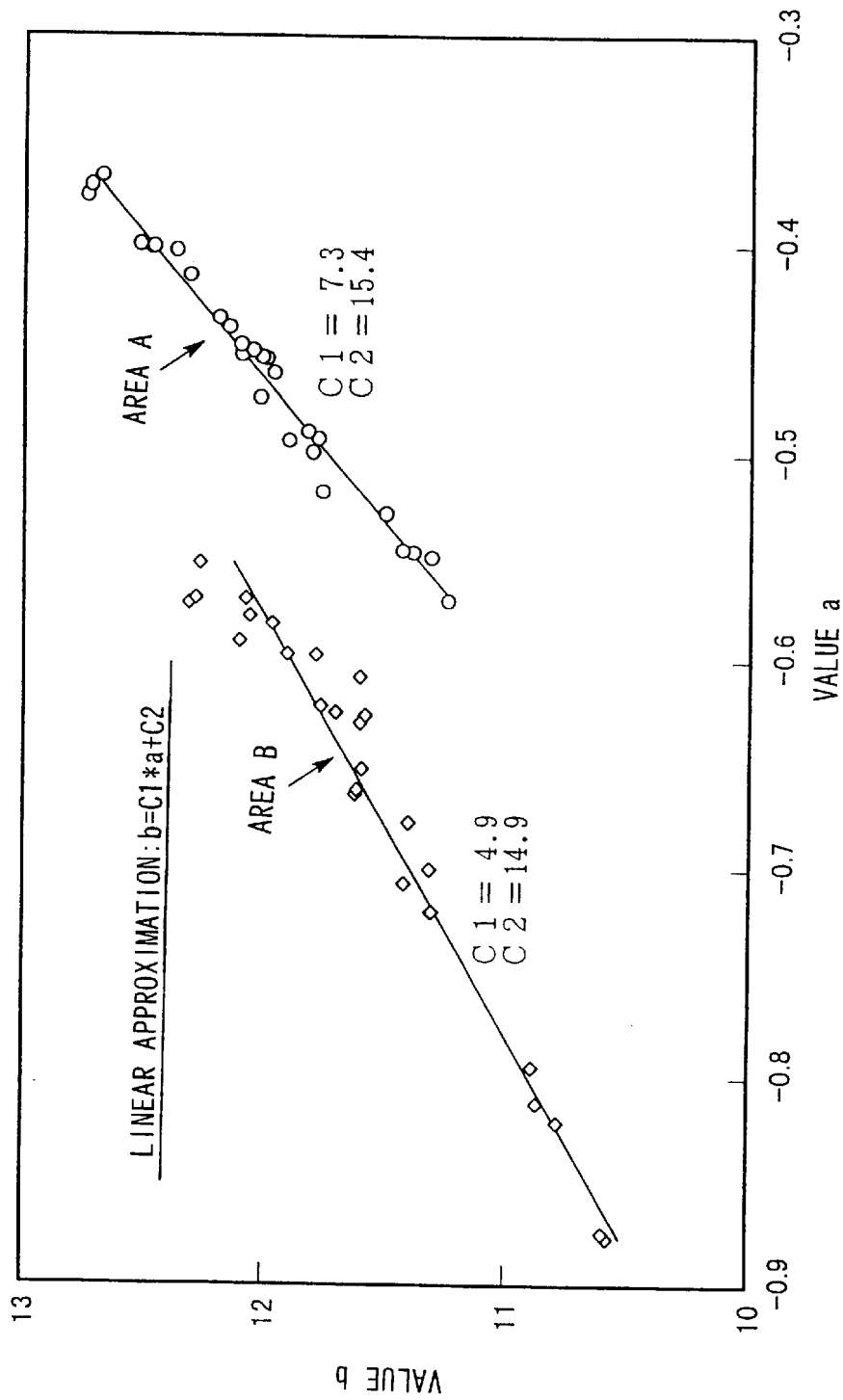
FIG. 11 presents test data with respect to the parameters "a" and "b" obtained separately from areas A and B and the results of regression analysis.

FIG. 11 presents test data with respect to parameters "a" and "b" separately obtained for the areas A and B and the results of the regression analysis. The designer stores the coefficients C1 and C2 corresponding to the individual areas in a read-only-memory inside the MPU 33.

(Explanation of the Quantization Method)

Figure 9:
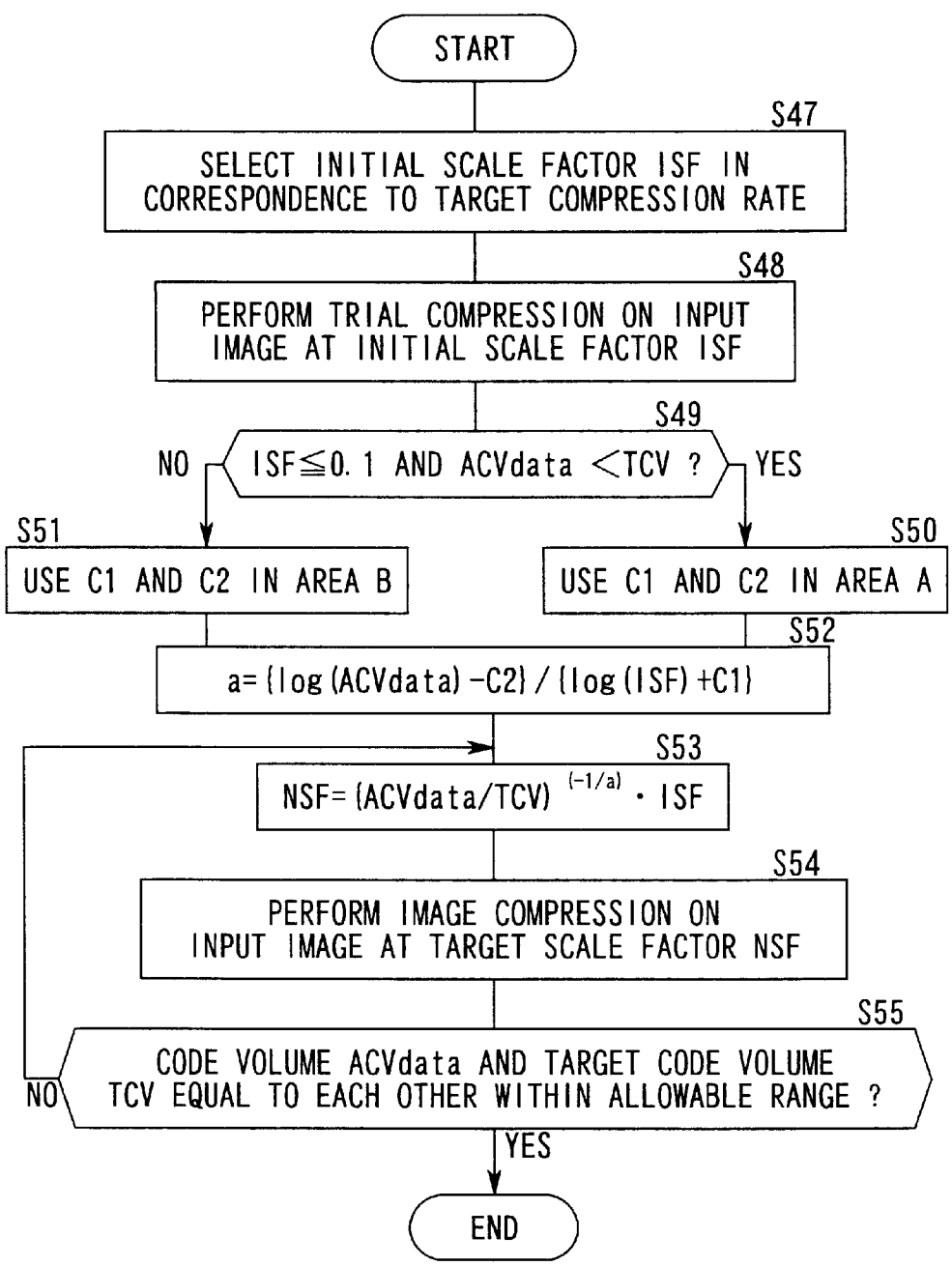
FIG. 9 is a flowchart schematically illustrating the image compression program (which includes the quantization program)

A detailed explanation of the specific quantization method is given below. FIG. 9 is a flowchart that schematically illustrates the image compression program, which includes the quantization program, stored in the MPU 33. First, the MPU 33 selects one initial scale factor ISF in correspondence to the value of the target compression rate (FIG. 9 S47).

The MPU 33 obtains an initial quantization table to be used for a trial compression by multiplying the standard quantization table by the initial scale factor ISF thus selected. Using this initial quantization table, the MPU 33 performs a trial compression on an input image (FIG. 9 S48).

Then, the MPU 33 selects a correct area for quantization processing from either the area A or B based upon the results (initial scale factor ISF, code volume ACVdata) of the trial compression (FIG. 9 S49).

In this example, the MPU 33 uses the coefficients C1 and C2 for the area A if conditions "initial scale factor ISF≦0.1 and code volume ACVdata<target code volume TCV" are satisfied (FIG. 9 S49 YES) (FIG. 9 S50). Otherwise (FIG. 9 S49 NO) the coefficients C1 and C2 for the area B are used (FIG. 9 S51).

Next, the MPU 33 calculates;

$$a = \{log(ACVdata) - C2\}/\{log(ISF) + C1\} \qquad (10),$$

using the code volume ACVdata after the trial compression and the initial scale factor ISF to ascertain the undetermined parameter "a" (FIG. 9 S52). It is to be noted that the coefficients C1 and C2 in the expression 10 above are those selected through the area selection described above.

Next, the MPU 33 calculates;

$$NSF = (ACVdata/TCV)^{(-1/a)} * ISF \qquad (11),$$

using the target code volume TCV to determine an appropriate target scale factor NSF for achieving the target code volume TCV (FIG. 9 S53). Next, the MPU 33 performs image compression on the input image again, using the target scale factor NSF (FIG. 9 S54).

At this point, the MPU 33 makes a decision as to whether or not the code volume after the image compression falls within an allowable range of the target code volume TCV (FIG. 9 S55). If it falls outside the allowable range by any chance (FIG. 9 S55 NO), the MPU 33 returns to the operation in step S53 to repeat the image compression with an updated target scale factor NSF.

If, on the other hand, it falls within the allowable range (FIG. 9 S55 YES), the MPU 33 decides that the desired image compression (quantization) has been achieved and ends the operation.

(Advantages of the Second Embodiment)

As explained above, advantages similar to those achieved in the first embodiment are achieved in the second embodiment. There is also an added advantage unique to the second embodiment in that since the processing is performed for the individual areas, the accuracy and the reproducibility of the statistical relationship for each area are further improved so that the parameters "a" and "b" can be ascertained with an even higher degree of accuracy.

In addition, area selection is made using the results of the trial compression in the second embodiment. As a result, it is possible to execute both "the selection of the area to be used" and "the parameter ascertaining" at once through a single trial compression so that the calculation quantity and the required length of processing time can be minimized.

(Third Embodiment)

Figure 12:
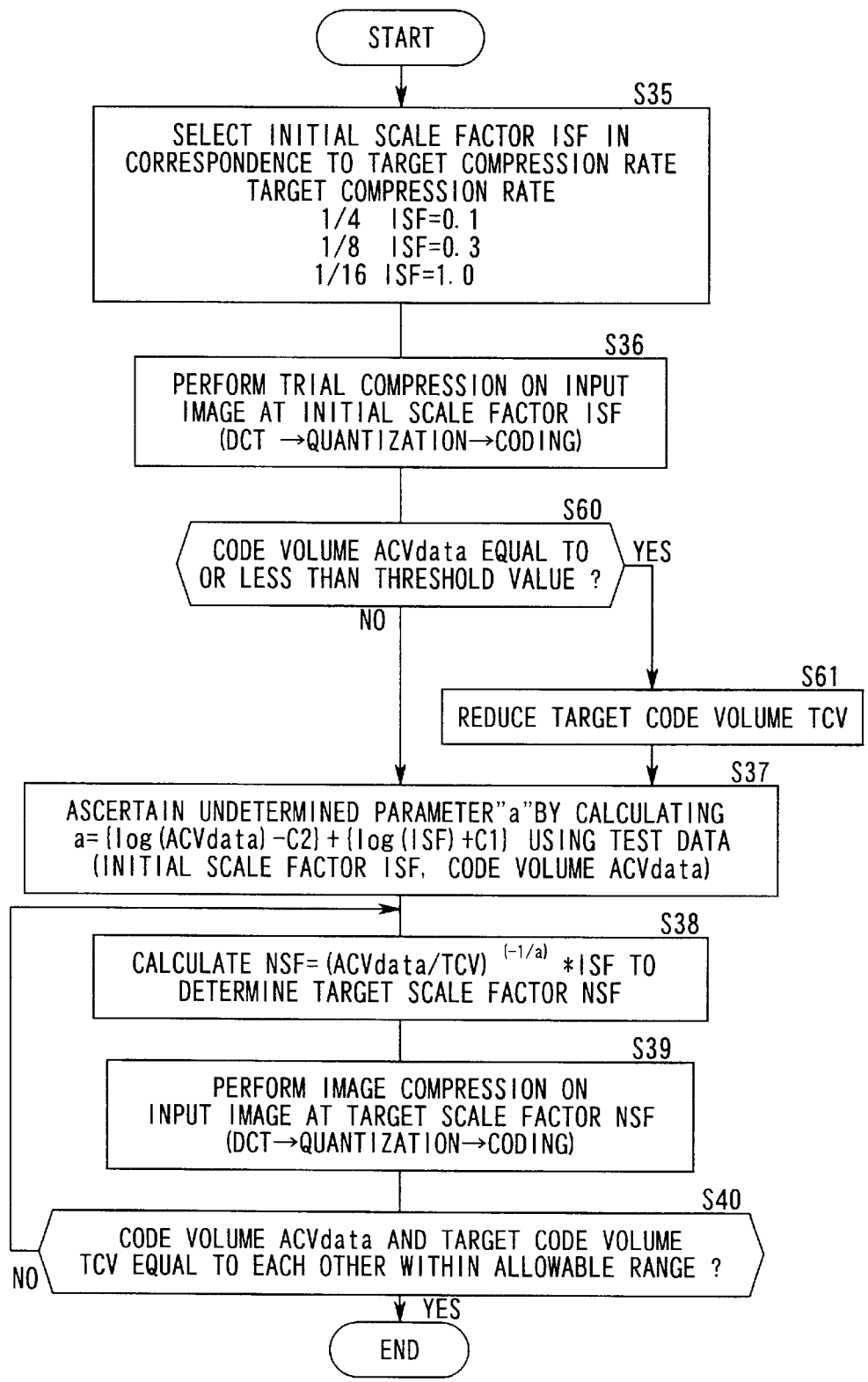
FIG. 12 is a flowchart schematically illustrating the image compression program (which includes the quantization program)

FIG. 12 is a flowchart that schematically illustrates the image compression program which includes the quantization program executed in the third embodiment. If it is to be noted that since the system configuration and the main operation of the third embodiment are almost identical to those in the first embodiment (see FIGS. 2, 3 and 4), their explanation is omitted.

The third embodiment is characterized in that the target code volume TCV is updated through threshold value decision-making performed on the code volume ACVdata resulting from a trial compression as illustrated in FIG. 12 (FIG. 12 S60 and S61). Such an operation performed in the third embodiment makes it possible to change the target code volume in a flexible manner by making a rough judgment in regard to the contents of an input image (whether the image is a line drawing or a natural picture, whether the gradation is complicated or flat, whether the number of colors is great or small, and the like) based upon the code volume after the trial compression.

Concretely, when the code volume ACVdata resulting from a trial compression is less than a predetermined threshold value (FIG. 12 S60 YES), the target code volume TCV is reduced (FIG. 12 S61). When the code volume ACVdata resulting from the trial compression is less than the threshold value, a difference between the scale factor at the trial compression and the scale factor estimated to obtain the target code volume becomes big. This causes a problem that the accuracy of estimated scale factor is reduced. On the other hand, when the code volume ACVdata resulting from the trial compression is less than the threshold value, the amount of information as to the image is not big and this means the quality of the image is not reduced even when the target code volume is set smaller than the original target code volume. Accordingly, in the third embodiment, when the code volume ACVdata resulting from the trial compression is less than the threshold value, the target code volume is set smaller than the original target code volume in order to improve the accuracy of estimating of the scale factor. By this means, it can be achieved to improve the accuracy of estimating of the scale factor without reducing of the image quality. Furthermore, the size of file is reduced, accordingly the processing time is reduced and the recording medium is utilized more efficiently.

Also, it may be adopted that the target code volume is increased when the code volume obtained during the trial stage is relatively large and, consequently, high compression is difficult to achieve. By this means, it is possible to avoid any degradation of information.

In addition, such a change of the target code volume is executed by using the results of the trial compression. Thus, it is possible to execute both "the change of the target code volume" and "the parameter ascertaining" at once through a single trial compression so that the calculation quantity and the required length of processing time can be minimized.

(Fourth Embodiment)

Since the system configuration and the main operation of the fourth embodiment are almost identical to those of the first embodiment (see FIGS. 2, 3 and 4), their explanation is omitted.

(Explanation of the Preparation)

Figure 13:
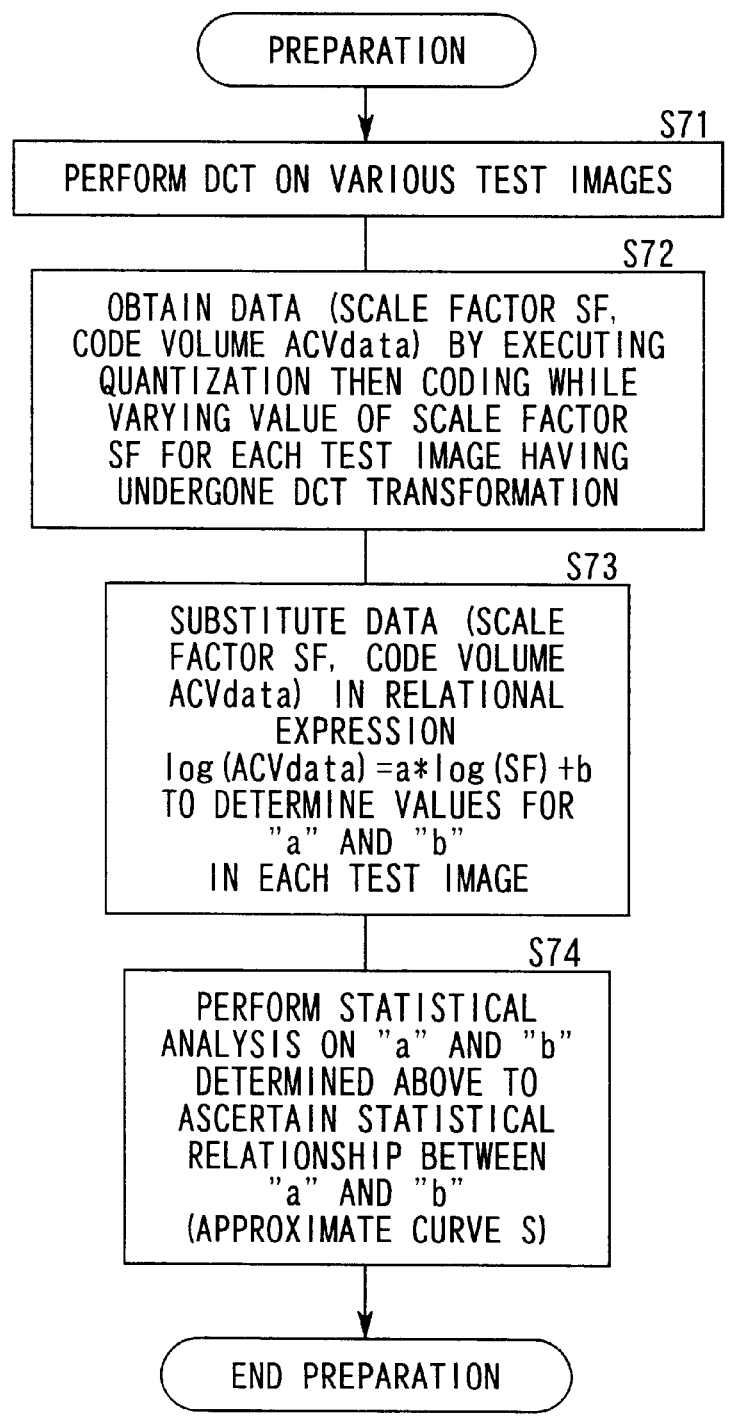
FIG. 13 illustrates the preparation procedure.

FIG. 13 is a flowchart illustrating the preparation procedure executed in the fourth embodiment. First, the procedure of this preparation is explained (in this context, the executor of the preparation is assumed to be the developer of the program to simplify the explanation). The developer prepares test images of as many types as possible within a range representative of the images to be processed. The developer executes DCT on these test images (FIG. 13 S71).

Next, the developer obtains a number of sets of data (scale factor SF, code volume ACVdata) by repeating quantization and coding while gradually changing the value of the scale factor SF (FIG. 13 S72).

Next, the developer performs regression analysis on the data corresponding to the individual test images and determines parameters "a" and "b" that satisfy the relational expression:

$$log(ACVdata)=a*log(SF)+b \qquad (12).$$

(FIG. 13 S73)

Figure 15:
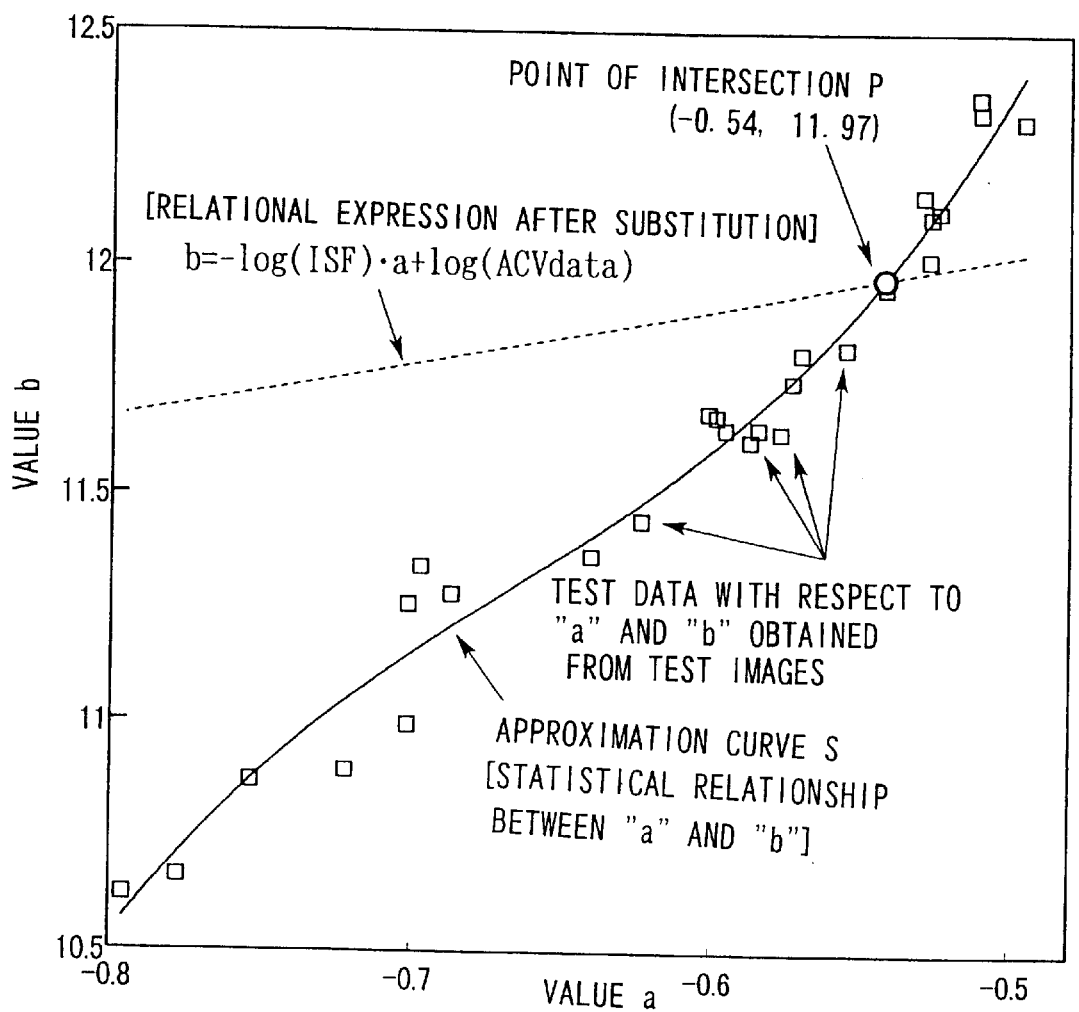
FIG. 15 presents plotted test data with respect to the undetermined parameters "a" and "b"

In FIG. 15, specific test data with respect to the parameters "a" and "b" obtained through this process are plotted. At this time, the developer performs a statistical analysis on the test data with respect to "a" and "b" presented in FIG. 15 to obtain an approximation curve (S in FIG. 15) that represents the statistical relationship between "a" and "b" (FIG. 13 S74). The developer then stores the approximation curve S thus obtained in the quantization program in an expression format such as table data, coefficients in a polynomial, a functional expression or the like.

(Explanation of the Quantization Method)

The following is a detailed explanation of the quantization method.

Figure 14:
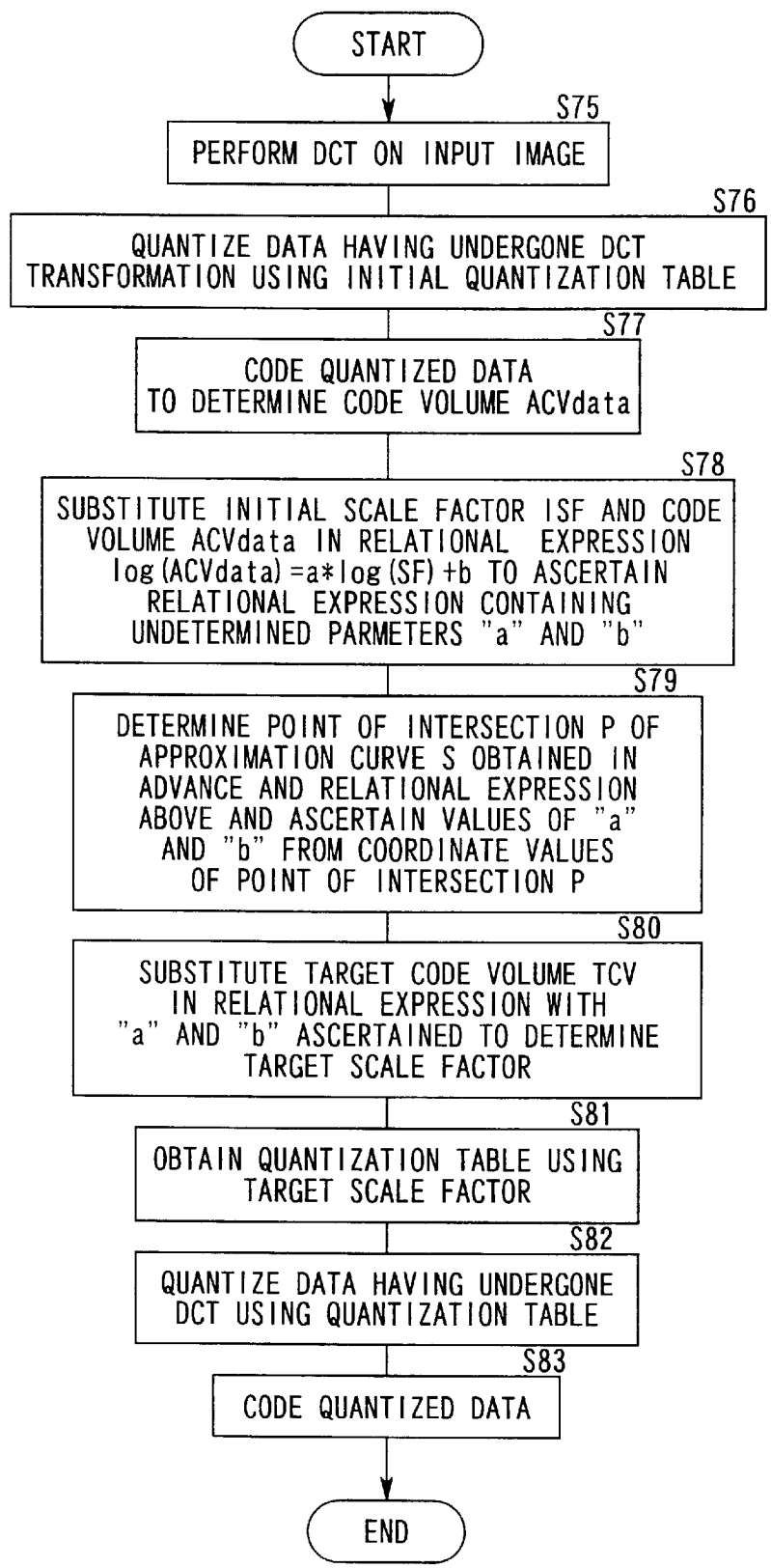
FIG. 14 is a flowchart schematically illustrating the image compression program (which includes the quantization program)

FIG. 14 is a flowchart that schematically illustrates the image compression program which includes the quantization program executed by the MPU 12. First, the MPU 12 performs DCT on an input image (FIG. 14 S75).

Next, the MPU 12 quantizes the data that have undergone the DCT by using an initial quantization table (FIG. 14 S76). The MPU 12 then calculates a code volume ACVdata achieved when the quantized data are coded (FIG. 14 S77). At this point, the MPU 12 substitutes the code volume ACV data and the initial scale factor ISF in a relational expression:

$$log(ACVdata)=a*log(ISF)+b \qquad (13),$$

to obtain a relational expression that contains undetermined parameters "a" and "b" (FIG. 14 S78).

Next, a point of intersection (P in FIG. 15) of the straight line expressed in the expression 13 and the approximation curve S is determined in the coordinate space whose axes are the undetermined parameters "a" and "b". The values of the undetermined parameters "a" and "b" are ascertained based upon the coordinates of the point of intersection P (FIG. 14 S79). The MPU 12 solves the relational expression 12 with the undetermined parameters "a" and "b" ascertained by substituting the target code volume TCV therein to obtain a target scale factor NSF (FIG. 14 S80).

The MPU 12 obtains a quantization table to be employed for the current operation by multiplying a standard quantization table by the target scale factor NSF (FIG. 14 S81). Using the quantization table thus obtained, the MPU 12 quantizes the data that have been quantized in step S75 again. Next, the MPU 12 codes the quantized data (FIG. 14 S83) again.

By implementing the series of processing described above, image compression can be performed with the code volume set close to the target code volume TCV.

(Advantage of the Fourth Embodiment)

As explained above, in the fourth embodiment, the number of undetermined parameters in the relational expression is reduced to substantially one by using the statistical relationship between the undetermined parameters "a" and "b". Thus, it is possible to ascertain all the undetermined parameters in the relational expression based upon the results of a trial compression that is performed at least once. Consequently, it is not necessary to execute a trial compression twice as required in the method in the prior art so that the calculation quantity and the required length of processing time can be reduced with a high degree of reliability.

(Supplementary Notes on the Embodiments)

It is to be noted that while the explanation is given above on the first through fourth embodiments in which the application is restricted to quantization for image compression, the quantization method according to the present invention is not limited to application for quantization in image compression. Generally speaking, it may be adopted in all applications of quantization that satisfy the following requirements (1) and (2).

(1) Two undetermined parameters "a" and "b" are contained in a relational expression representing the relationship between the scale factor and the code volume.

(2) There is a statistical relationship between the undetermined parameters "a" and "b".

In addition, in those instances of quantization, the format of the relational expression is not restricted to that used in the embodiments described above. More specifically, the format of the relational expression should be determined through testing or the like performed in the individual instances.

Furthermore, in the second embodiment, the scale factor and the code volume are used for the boundary requirements to divide the coordinate space into the two areas A and B as illustrated in FIG. 10. However, the invention is not limited to this method of area division. Under normal circumstances, areas should be defined as appropriate in conformance to the data distribution in the preparation. Thus, it goes without saying that the coordinate space may be divided into three or more areas. Moreover, the coordinate space may be divided into areas by using the scale factor only as the boundary requirement or by using the code volume only as the boundary requirement. It also goes without saying that the shape of the divided areas does not have to be rectangular and that they may assume any shape, such as oval or L shape.

(Example of Variation)

Figure 16:
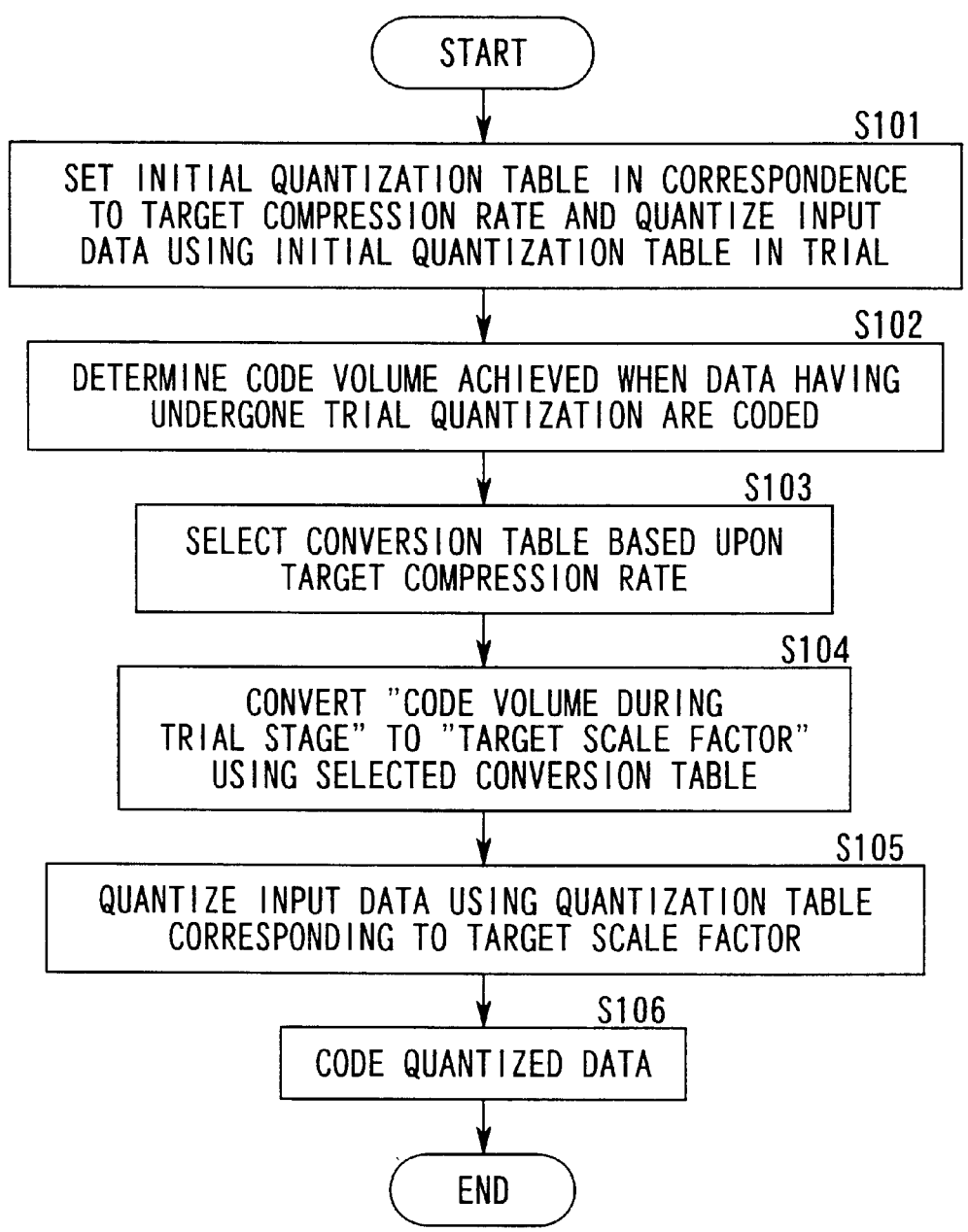
FIG. 16 is a flowchart schematically illustrating the image compression program (which includes the quantization program)

It is to be noted that while the target scale factor is determined through the process of undetermined parameter calculation in the embodiments explained earlier, it may be obtained through any other process. As explained earlier, the target scale factor can be determined since "the code volume during the trial stage" and "the target scale factor" correspond with each other on a one-to-one basis with a high probability. In other words, one code volume during the trial stage results in one target scale factor. Thus, by using the correlation between "the code volume during the trial stage" and "the target scale factor" which is stored in memory in advance, the target scale factor that corresponds to the code volume during the trial stage may be ascertained directly or through interpolation. In such a quantization method, in which the process for calculating the undetermined parameters can be skipped, the target scale factor can be determined quickly and easily. Specific procedural steps (1)~(6) performed in this method are described below. FIG. 16 is a flowchart illustrating the steps (2)~(6).

(1) Test quantization is performed on various types of test data as a preparation and a conversion table that indicates the correlation between "the code volume during the trial stage" and "the target scale factor" is obtained for each target compression rate.

(2) An initial quantization table is determined based upon the target compression rate, and using this initial quantization table, input data are quantized in a trial (FIG. 16 S101).

(3) The code volume achieved when the data that have undergone the trial quantization are coded is ascertained (FIG. 16 S102).

(4) A conversion table is selected in correspondence to the target compression rate (FIG. 16 S103). Using the selected conversion table, "the code volume during the trial stage" is converted to "the target scale factor" (FIG. 16 S104).

(5) Using the quantization table that corresponds to the target scale factor, the input data are quantized (FIG. 16 S105).

(6) Actual coding is performed on the quantized data (FIG. 16 S106).

In this embodiment, an appropriate target scale factor that corresponds to the target compression rate can be determined quickly through a simple procedure. It is to be noted that the procedure (1)~(6) described above may be programmed and recorded in a recording medium to enable execution of the procedural steps (1)~(6) on a computer using the recording medium. In addition, while the correlation is stored in memory in the form of conversion tables in the procedure (1)~(6) described above, the correlation may be stored in any other form. For instance, the correlation that has been ascertained may be stored as a mathematical expression.

Figure 17:
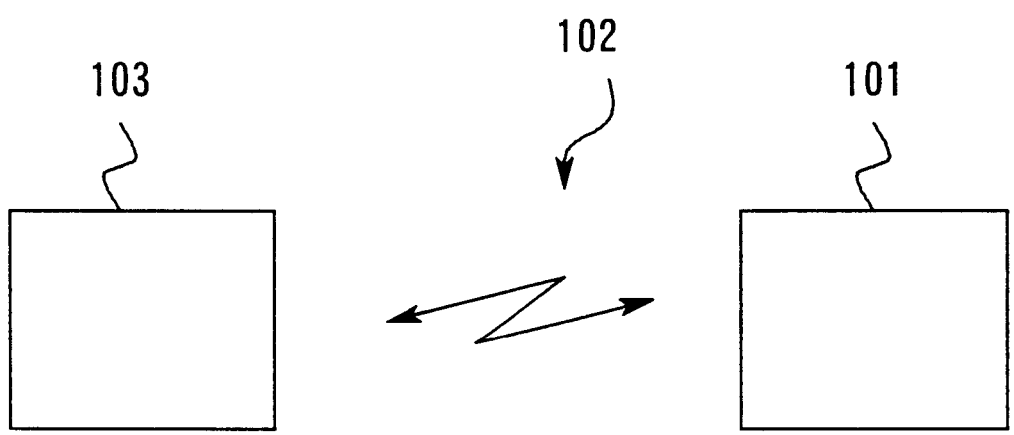
FIG. 17 illustrates how a data compression program may be provided through a communication line.

While the explanation is given in reference to the embodiments above on an example in which the image compression program that includes the quantization program and the installation program for installing the image compression program are provided in a recording medium constituted of the CD ROM 21, the recording medium may be constituted of any other form of memory. All types of recording media including magnetic tape, DVD and the like may be employed in the present invention. In addition, these programs may be provided by a data signal embodied in a carrier wave through a transmission medium such as a communication line, a typical example of which is the internet. FIG. 17 illustrates such a configuration. A computer 101 executes the quantization program explained earlier and is similar to the computer 11 in FIG. 2. The computer 101 has a function of connecting with a communication line 102. A computer 103 is a server that provides the data compression program stored therein. The communication line may be a communication line such as the internet or a communication line for telecomputing or it may be a dedicated communication line or the like. The communication line may includes a telephone line including a radio telephone such as a cellular phone.

What is claimed is:

1. A data compression method comprising:

a quantization trial step in which input data is quantized using an initial quantization table set in advance;

a coding trial step in which a code volume achieved when the data that has undergone quantization in the quantization trial step is coded is determined;

a relationship ascertaining step in which a scale factor in the initial quantization table and the code volume are substituted in a relational expression representing a relationship between a code volume and a scale factor containing two undetermined parameters a and b and the undetermined parameters in the relational expression are ascertained based upon the relational expression after substitution and a statistical relationship between the undetermined parameters a and b determined through a previous quantization operation;

a scale factor determining step in which a target scale factor corresponding to a target code volume is determined by using the relational expression having the undetermined parameters ascertained in the relationship ascertaining step substituted therein;

a quantization step in which the input data is quantized by using a quantization table corresponding to the target scale factor determined in the scale factor determining step; and a coding step in which the data that has undergone quantization in the quantization step is coded, wherein the relationship ascertaining step further includes:

(1) an area selection step in which, with a statistical relationship between the two undetermined parameters a and b ascertained in advance for each of a plurality of areas achieved by dividing a coordinate space whose axes are a scale factor and a code volume, one of the plurality of areas is selected based upon the scale factor in the initial quantization table and the code volume obtained in the coding trial step; and (2) an individual area relationship ascertaining step in which the scale factor in the initial quantization table and the code volume obtained in the coding trial step are substituted in the relational expression and the undetermined parameters in the relational expression are ascertained based upon the relational expression after substitution and the statistical relationship in the area selected in the area selection step.

2. A recording medium readable for an information processing apparatus, that stores a data compression program for use by the information processing apparatus, the data compression program comprising:

a quantization trial step in which input data is quantized using an initial quantization table set in advance;

a coding trial step in which a code volume achieved when the data that has undergone quantization in the quantization trial step is coded is determined;

a relationship ascertaining step in which a scale factor in the initial quantization table and the code volume are substituted in a relational expression representing a relationship between a code volume and a scale factor containing two undetermined parameters a and b and the undetermined parameters in the relational expression are ascertained based upon the relational expression after substitution and a statistical relationship between the undetermined parameters a and b determined through a previous quantization operation;

a scale factor determining step in which a target scale factor corresponding to a target code volume is determined by using the relational expression having the undetermined parameters ascertained in the relationship ascertaining step substituted therein;

a quantization step in which the input data is quantized by using a quantization table corresponding to the target scale factor determined in the scale factor determining step; and a coding step in which the data that has undergone quantization in the quantization step is coded, wherein the relationship ascertaining step further includes:

(1) an area selection step in which, with a statistical relationship between the two undetermined parameters a and b ascertained in advance for each of a plurality of areas achieved by dividing a coordinate space whose axes are a scale factor and a code volume, one of the plurality of areas is selected based upon the scale factor in the initial quantization table and the code volume obtained in the coding trial step; and (2) an individual area relationship ascertaining step in which the scale factor in the initial quantization table and the code volume obtained in the coding trial step are substituted in the relational expression and the undetermined parameters in the relational expression are ascertained based upon the relational expression after substitution and the statistical relationship in the area selected in the area selection step.

3. An electronic camera comprising:

an image-capturing unit that captures an image of a subject and outputs image data;

a quantization trial unit that quantizes the image data using an initial quantization table set in advance;

a coding trial unit that determines a code volume achieved when the data that has undergone quantization at the quantization trial unit is coded;

a relationship ascertaining unit that substitutes a scale factor in the initial quantization table and the code volume in a relational expression representing a relationship between a code volume and a scale factor containing two undetermined parameters a and b and ascertains the undetermined parameters in the relational expression based upon the relational expression after substitution and a statistical relationship between the undetermined parameters a and b determined through a previous quantization operation;

a scale factor determining unit that determines a target scale factor corresponding to a target code volume by using the relational expression having the undetermined parameters ascertained at the relationship ascertaining unit substituted therein;

a quantization unit that quantizes the image data by using a quantization table corresponding to the target scale factor determined at the scale factor determining unit; and a coding unit that codes the data that has undergone quantization at the quantization unit, wherein the relationship ascertaining unit further includes:

(1) an area selection unit that, with a statistical relationship between the two undetermined parameters a and b ascertained in advance for each of a plurality of areas achieved by dividing a coordinate space whose axes are a scale factor and a code volume, selects one of the plurality of areas based upon the scale factor in the initial quantization table and the code volume obtained at the coding trial unit; and (2) an individual area relationship ascertaining unit that substitutes the scale factor in the initial quantization table and the code volume obtained at the coding trial unit in the relational expression and ascertains the undetermined parameters in the relational expression based upon the relational expression after substitution and the statistical relationship in the area selected at the area selection unit.

4. A data compression method comprising:

a quantization trial step in which input data is quantized using an initial quantization table set in advance;

a coding trial step in which a code volume achieved when the data that has undergone quantization in the quantization trial step is coded is determined;

a scale factor determining step in which a target scale factor corresponding to target code volume is determined based upon the code volume determined in the coding trial step, the target code volume and a statistical relationship between a scale factor and a code volume, the statistical relationship comprising a parameter set in advance to have a value which varies according to the code volume determined in the coding trial step;

a quantization step in which the input data is quantized by using a quantization table corresponding to the target scale factor determined in the scale factor determining step; and a coding step in which the data that has undergone quantization in the quantization step is coded.

5. A data compression method according to claim 4, wherein the parameter is set in advance to have the value that varies monotonously according to the code volume.

6. A data compression method according to claim 4, wherein:

the parameter is set in advance to have the value that becomes greater as the code volume becomes greater and is referred to as a;

the code volume determined in the coding trial step is referred to as ACVdata;

a scale factor in the initial quantization table is referred to as ISF;

the target code volume is referred to as TCV;

the target scale factor is referred to as NSF; and in the scale factor determining step, the target scale factor NSF is determined by calculating NSF=(ACVdata/TCV)$^{(-1/a)}$*ISF.

7. A recording medium readable for an information processing apparatus, that stores a data compression program for use by the information processing apparatus, the data compression program comprising:

a quantization trial step in which input data is quantized using an initial quantization table set in advance;

a coding trial step in which a code volume achieved when the data that has undergone quantization in the quantization trial step is coded is determined;

a scale factor determining step in which a target scale factor corresponding to a target code volume is determined based upon the code volume determined in the coding trial step, the target code volume and a statistical relationship between a scale factor and a code volume, the statistical relationship comprising a parameter set in advance to have a value which varies according to the code volume determined in the coding trial step;

a quantization step in which the input data is quantized by using a quantization table corresponding to the target scale factor determined in the scale factor determining step; and a coding step in which the data that has undergone quantization in the quantization step is coded.

8. An electronic camera comprising:

an image-capturing unit that captures an image of a subject and outputs image data;

a quantization trial unit that quantizes the image data using an initial quantization table set in advance;

a coding trial unit that determines a code volume achieved when the data that has undergone quantization at the quantization trial unit is coded;

a scale factor determining unit that determines a target scale factor corresponding to a target code volume based upon the code volume determined by the coding trial unit, the target code volume and a statistical relationship between a scale factor and a code volume, the statistical relationship comprising a parameter set in advance to have a value which varies according to the code volume determined by the coding trial unit;

a quantization unit that quantizes the image data by using a quantization table corresponding to the target scale factor determined at the scale factor determining unit; and a coding unit that codes the data that has undergone quantization at the quantization unit.

* * * * *